United States Patent
Anderson et al.

(10) Patent No.: US 11,117,368 B2
(45) Date of Patent: Sep. 14, 2021

(54) FLUIDIC DIE

(71) Applicant: HEWLETT-PACKARD DEVELOPMENT COMPANY, L.P., Spring, TX (US)

(72) Inventors: Daryl E Anderson, Corvallis, OR (US); Eric Martin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/482,634

(22) PCT Filed: Apr. 14, 2017

(86) PCT No.: PCT/US2017/027619
§ 371 (c)(1),
(2) Date: Jul. 31, 2019

(87) PCT Pub. No.: WO2018/190864
PCT Pub. Date: Oct. 18, 2018

(65) Prior Publication Data
US 2020/0108601 A1     Apr. 9, 2020

(51) Int. Cl.
*B41J 2/045* (2006.01)
*G06K 15/10* (2006.01)

(52) U.S. Cl.
CPC ....... *B41J 2/04548* (2013.01); *B41J 2/04581* (2013.01); *G06K 15/107* (2013.01)

(58) Field of Classification Search
None
See application file for complete search history.

(56) References Cited

U.S. PATENT DOCUMENTS

| | | |
|---|---|---|
| 5,483,625 A | 1/1996 | Robertson et al. |
| 6,680,785 B1 | 1/2004 | Nibe et al. |
| 6,932,453 B2 | 8/2005 | Feinn et al. |

(Continued)

FOREIGN PATENT DOCUMENTS

| | | |
|---|---|---|
| JP | 2003001820 A | 1/2003 |
| WO | WO-09025182 | 2/2009 |

(Continued)

OTHER PUBLICATIONS

Boley, J.W. et al., Effect of Print Masks on the Functional Performance of Inkjet Printed Pd Hexadecanethiolate in Toluene, Jan. 1, 2013, <http:www.jwilliamboley.com/pdf/prin.

*Primary Examiner* — Alejandro Valencia
(74) *Attorney, Agent, or Firm* — Rathe Lindenbaum LLP

(57) ABSTRACT

A fluidic die may include an array of fluid actuators, an actuation data register to store actuation data that indicates each fluid actuator to actuate for a set of actuation events, a mask register to store mask data that indicates a set of fluid actuators of the array enabled for actuation for a respective actuation event of the set of actuation events, a pattern select register to store a pattern selection, input mask data generation circuitry to build a set of mask data with subsets of mask data, each of the subsets having a pattern based upon a pattern selection input, and to populate the mask register with the set of mask data, and actuation logic to electrically actuate a subset of the fluid actuators based at least in part on the actuation data register and the mask register for the respective actuation event.

20 Claims, 15 Drawing Sheets

(56) References Cited

U.S. PATENT DOCUMENTS

| | | | |
|---|---|---|---|
| 7,261,388 B2* | 8/2007 | Vega | G06K 15/107 |
| | | | 347/13 |
| 7,497,536 B2* | 3/2009 | Benjamin | B41J 2/04541 |
| | | | 347/12 |
| 7,654,627 B2 | 2/2010 | Yajima | |
| 2003/0103102 A1 | 6/2003 | Otsuki | |
| 2005/0024402 A1 | 2/2005 | Quintana | |
| 2005/0078133 A1 | 4/2005 | Molinet | |
| 2005/0190217 A1 | 9/2005 | Wade et al. | |

FOREIGN PATENT DOCUMENTS

| | | |
|---|---|---|
| WO | WO-2013115804 A1 | 8/2013 |
| WO | WO-2014090345 | 6/2014 |
| WO | WO-2016068880 | 5/2016 |

* cited by examiner

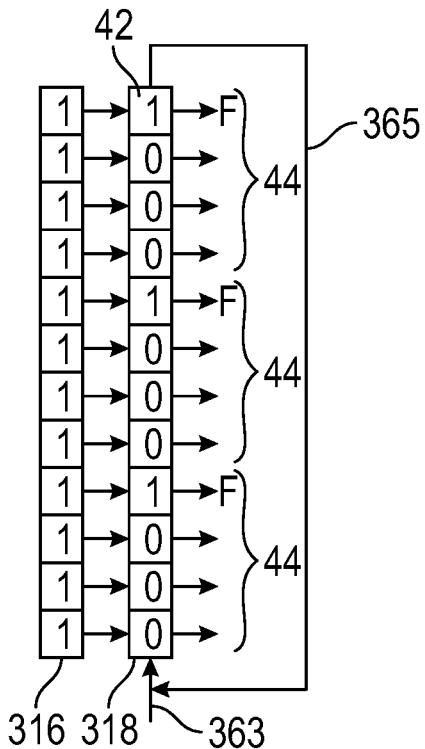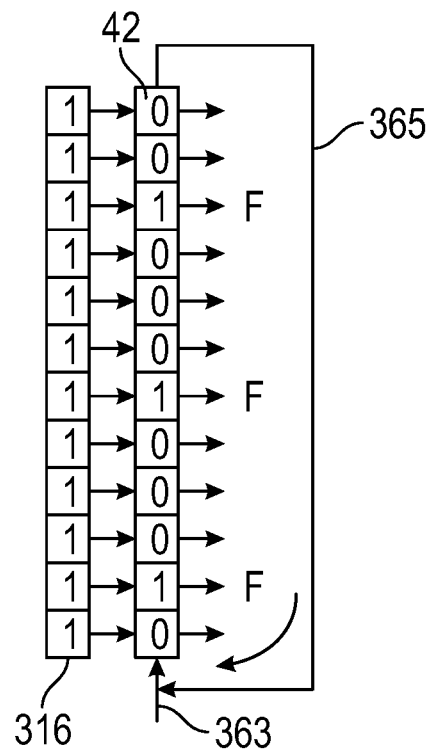
FIG. 5A  FIG. 5B
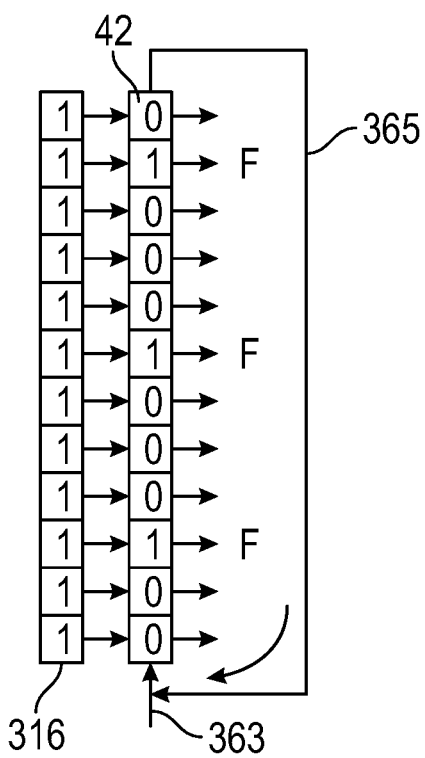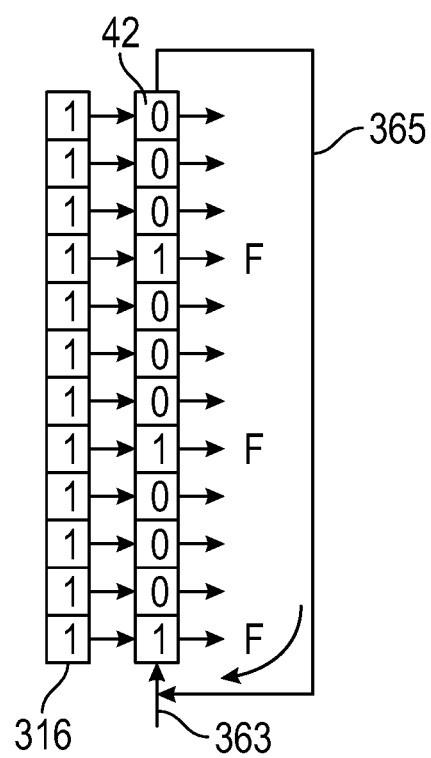
FIG. 5C  FIG. 5D

FLUIDIC DIE

BACKGROUND

Fluidic dies may control movement and ejection of fluid. Such fluidic dies may include fluid actuators that may be actuated to thereby cause displacement of fluid. Some example fluidic dies may be printheads, where the fluid may correspond to ink.

BRIEF DESCRIPTION OF THE DRAWINGS

FIGS. 5A, 5B, 5C and 5D are schematic diagrams of an example actuation data register and an example mask register storing example sets of actuation data and mask data, respectively, illustrating one example set of actuation events and shifting of the set of mask data for each of the actuation events of the set.

Figure 1:
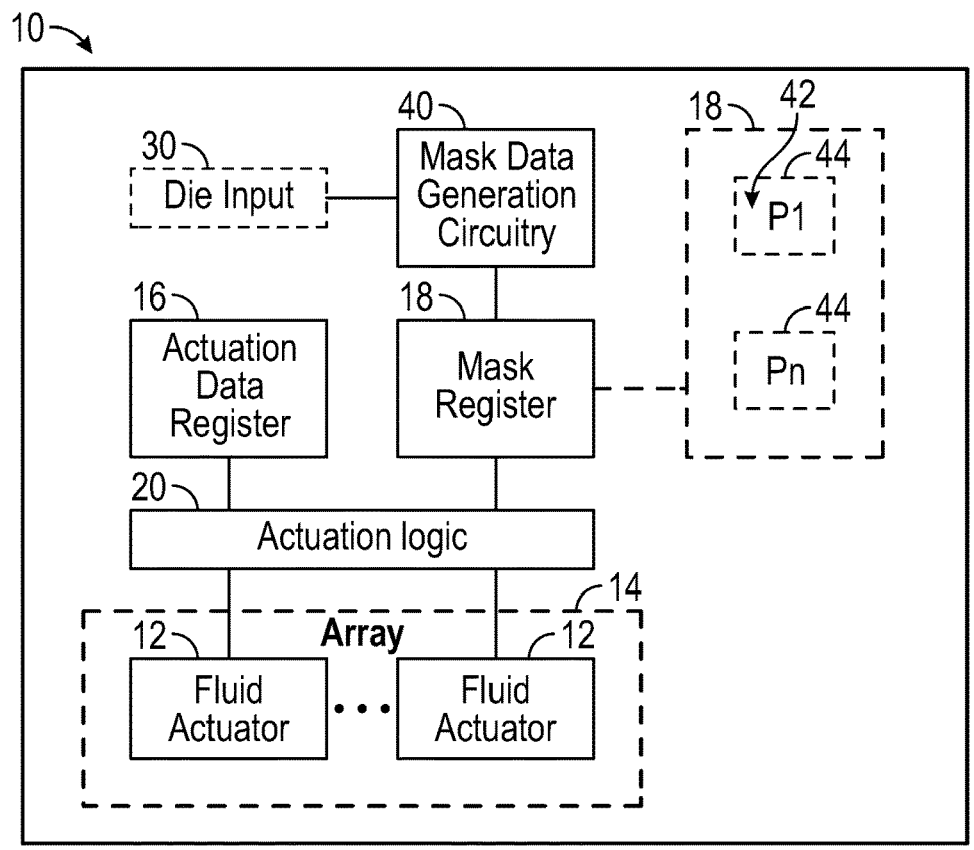
FIG. 1 is a block diagram schematically illustrating so components of an example fluidic die.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Examples of fluidic dies may comprise fluid actuators. The fluid actuators may include a piezoelectric membrane based actuator, a thermal resistor based actuator, an electrostatic membrane actuator, a mechanical/impact driven membrane actuator, a magneto-strictive drive actuator, or other such elements that may cause displacement of fluid responsive to electrical actuation. Fluidic dies described herein may comprise a plurality of fluid actuators, which may be referred to as an array of fluid actuators. Moreover, an actuation event, as used herein, may refer to concurrent actuation of fluid actuators of the fluidic die to thereby cause fluid displacement.

In example fluidic dies, the array of fluid actuators may be arranged in respective sets of fluid actuators, where each such set of fluid actuators may be referred to as a "primitive" or a "firing primitive." A primitive generally comprises a group of fluid actuators that each have a unique actuation address. In some examples, electrical and fluidic constraints of a fluidic die may limit which fluid actuators of each primitive may be actuated concurrently for a given actuation event. Therefore, primitives facilitate addressing and subsequent actuation of fluid ejector subsets that may be concurrently actuated for a given actuation event. A number of fluid ejectors corresponding to a respective primitive may be referred to as a size of the primitive.

To illustrate by way of example, if a fluidic the comprises four primitives, where each respective primitive comprises eight respective fluid actuators (each eight fluid actuator group having an address 0 to 7), and electrical and fluidic constraints limit actuation to one fluid actuator per primitive, a total of four fluid actuators (one from each primitive) may be concurrently actuated for a given actuation event. For example, for a first actuation event, the respective fluid actuator of each primitive having an address of 0 may be actuated. For a second actuation event, the respective fluid actuator of each primitive having an address of 1 may be actuated. As will be appreciated, the example is provided merely for illustration purposes. Fluidic dies contemplated herein may comprise more or less fluid actuators per primitive and more or less primitives per die.

In examples described herein, a fluidic die may comprise an actuation data register and a mask register. The actuation data register may store actuation data that indicates each fluid actuator to actuate for a set of actuation events. The mask register may store mask data that indicates a subset of fluid actuators of the array of fluid actuators enabled for actuation for a respective actuation event of the set of actuation events. Therefore, it may be appreciated that examples contemplated herein may facilitate concurrent actuation of different arrangements of fluid actuators based on the mask data of the mask register. In some examples, the mask data may group fluid actuators in primitives, where the primitives may be identified via the mask data. Accordingly, examples described herein may facilitate variable primitive size. For example, for a first actuation event, fluid actuators may be arranged in primitives of a first primitive size, as defined by first mask data stored in the mask register, and for a second actuation event, second mask data may be loaded into the mask register such that fluid actuators may be arranged in primitives of a second primitive size.

In the examples described herein, the mask data that is stored in the mask register may be generated on the fluidic die itself, potentially reducing consumption of transmission bandwidth and increasing speed. In the described examples, mask data generation circuitry located on the fluidic die builds, a set of mask data from building blocks or subsets of mask data, wherein each of the subsets has a pattern based upon a received pattern selection input. In one implementation, the subsets of mask data forming the set of mask data have the same repeating pattern of mask data. In other implementations, the subsets of mask data may have distinct individual patterns of mask data.

In one implementation, mask data generation circuitry may comprise a pattern select register, a shift register and the shift pattern state machine. The pattern select register stores the pattern selection input. Such input may indicate a selected length of a pattern of mask data, wherein each pattern of mask data is the same but for a number of trailing values that disable, mask or block the enablement of corresponding fluid actuators during the respective actuation event. For example, each pattern may have an initial bit having a first value followed by a number of proceeding bits having a second value different than the first value, the number of proceeding bits based upon the selected length of the selected pattern of mask data. In other examples, different available patterns of mask data are stored on the fluidic die, wherein the input indicates which of the available patterns of mask data are being selected for populating the mask register.

In the examples described herein, the shift register temporarily stores a pattern of mask data to be used to populate the mask register. The shift pattern state machine loads the shift register with a selected pattern of mask data based upon the pattern selection input stored in the pattern select register. The shift pattern state machine repeatedly loads the mask register with the selected pattern of mask data from the shift register until the mask register is populated with mask data for each of the fluid actuators.

In some examples, a fluid actuator may be disposed in a nozzle, where the nozzle may comprise a fluid chamber and a nozzle orifice in addition to the fluid actuator. The fluid actuator may be actuated such that displacement of fluid in the fluid chamber may cause ejection of a fluid drop via the nozzle orifice. Accordingly, a fluid actuator disposed in a nozzle may be referred to as a fluid ejector.

Some example fluidic dies comprise microfluidic channels. Microfluidic channels may be formed by performing etching, microfabrication (e.g., photolithography), micromachining processes, or any combination thereof in a substrate of the fluidic die. Some example substrates may include silicon based substrates, glass based substrates, gallium arsenide based substrates, and/or other such suitable types of substrates for microfabricated devices and structures. Accordingly, microfluidic channels, chambers, orifices, and/or other such features may be defined by surfaces fabricated in the substrate of a fluidic die. Furthermore, as used herein a microfluidic channel may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Example fluidic dies described herein may comprise microfluidic channels in which fluidic actuators may be disposed. In such implementations, actuation of a fluid actuator disposed in a microfluidic channel may generate fluid displacement in the microfluidic channel. Accordingly, a fluid actuator disposed in a microfluidic channel may be referred to as a fluid pump.

FIG. 1 is a schematic diagram of portions of an example fluidic die 10 that builds a set of mask data from subsets of mask data on the fluidic die and populates a mask register with the built set of mask data. The subsets of mask data that form the set of mask data in the mask register may be varied or selected to provide enhanced flexibility and control over displacement of fluid by an array of fluid actuators on the fluidic die. Fluidic die 10 comprises fluid actuators 12, actuation data register 16, mask register 18, actuation logic 20, die input 30 and mask generation circuitry 40. In one implementation, each of fluid actuators 12, actuation data register 16, mask register 18, actuation logic 20, die input 30 and mask generation circuitry 40 are located on or within a substrate.

Fluid actuators 12 comprise devices or elements that cause displacement of a fluid in response to electrical actuation. The fluid actuators 12 may include a piezoelectric membrane based actuator, a thermal resistor based actuator, an electrostatic membrane actuator, a mechanical/impact driven membrane actuator, a magneto-strictive drive actuator, or other such elements. In one implementation, fluid actuators 12 are in the form of fluid pumps. In another implementation, fluid actuators 12 are in the form of fluid ejectors which may be part of nozzles. In some implementations, fluid actuators 12 comprise a mixture of different types of fluid actuators the form of both pumps and ejectors.

In the example illustrated, fluid actuators 12 are in an array 14. In one implementation; array 14 comprise a row or column of such fluid actuators. In another implementation, array 14 may comprise fluid actuators 12 having other layouts or arrangements. As shown in FIG. 1, the array of fluid actuators 4 may comprise various numbers of fluid actuators 12.

Actuation data register 16 comprises a memory data register that may store actuation data that indicates each fluid actuator to actuate for a set of actuation events. Mask register 18 comprises a memory data register that may store mask data that indicates a set of fluid actuators of the array enabled for actuation for a respective actuation event of the set of actuation events. In one implementation, the actuation data register 16 comprises the number of bits or data storage locations corresponding to each of the fluid actuators 12 of array 14. In such an implementation, mask register 18 comprises a number of bits or data storage locations corresponding to each of the fluid actuators 12 of array 14.

Actuation logic 20 comprises logic circuitry such as processing hardware and/or software, coupled to actuation data register 16, mask register 18 and fluid actuators 12. Actuation logic 20 is to electrically actuate a subset of fluid actuators 12 based at least in parts, upon actuation data residing in actuation data register 16 and mask data residing in mask register 18 for an individual actuation event of a set or larger series of actuation events.

Die input 30 comprises an input structure on die 10 that facilitates the receipt of pattern selection input. In one implementation, die input 30 comprises an electrical connection, such as an electrical contact pad, by which electrical signals are transmitted to die 10, the electrical signals serving as the pattern selection input. The pattern selection input identifies a pattern or a characteristic of a subset of mask data to be used by mask data generation circuitry when generating a set of mask data for populating mask register 18.

Mask data generation circuitry 40 comprises memory and/or logic elements on die 10 that build a set of mask data with subsets of mask data that serve as building blocks for the larger set of mask data populating mask register 18. As shown in more detail by broken lines in FIG. 1, mask data generation circuitry 40 builds a set 42 of mask data from a plurality of individual subsets 44 of mask data. In one implementation, mask data generation circuitry 40 loads the individual subsets 44 of mask data into mask register 18 when forming the set 42 of mask data. Each of the subsets have a pattern of mask data based upon at least one pattern selection input received at die input 30. In one implementation, each of subsets 44 has a same pattern of mask data. In some implementations, some of subsets 44 may have different patterns of mask data. In one implementation, each subset 44 may correspond to a "primitive" as described above.

Mask data generation circuitry 40 facilitates the building of different sets of mask data directly on die 10. Because the different sets of mask data may be built directly on die 40, it is contemplated that the consumption of transmission bandwidth may be reduced and speed may be increased. Moreover, die 10 may provide enhanced flexibility and control over the displacement of fluid by fluid actuators 12 through the selection and control over the pattern of mask data in the subsets 44 that make up the larger set 42 of mask data that populates rusk register 14.

In fluidic die 10 and each of the fluidic dies described herein, an actuation data register, a mask register and actuation logic are illustrated and described with respect to a single array of fluid actuators. It should be appreciated that each of such fluidic dies may comprise multiple arrays of fluid actuators. In such implementations, each array of fluid actuators may have an associated actuation data register, mask register and actuation logic. In some implementations, each array of fluid actuators may have dedicated mask data generation circuitry.

Figure 2:
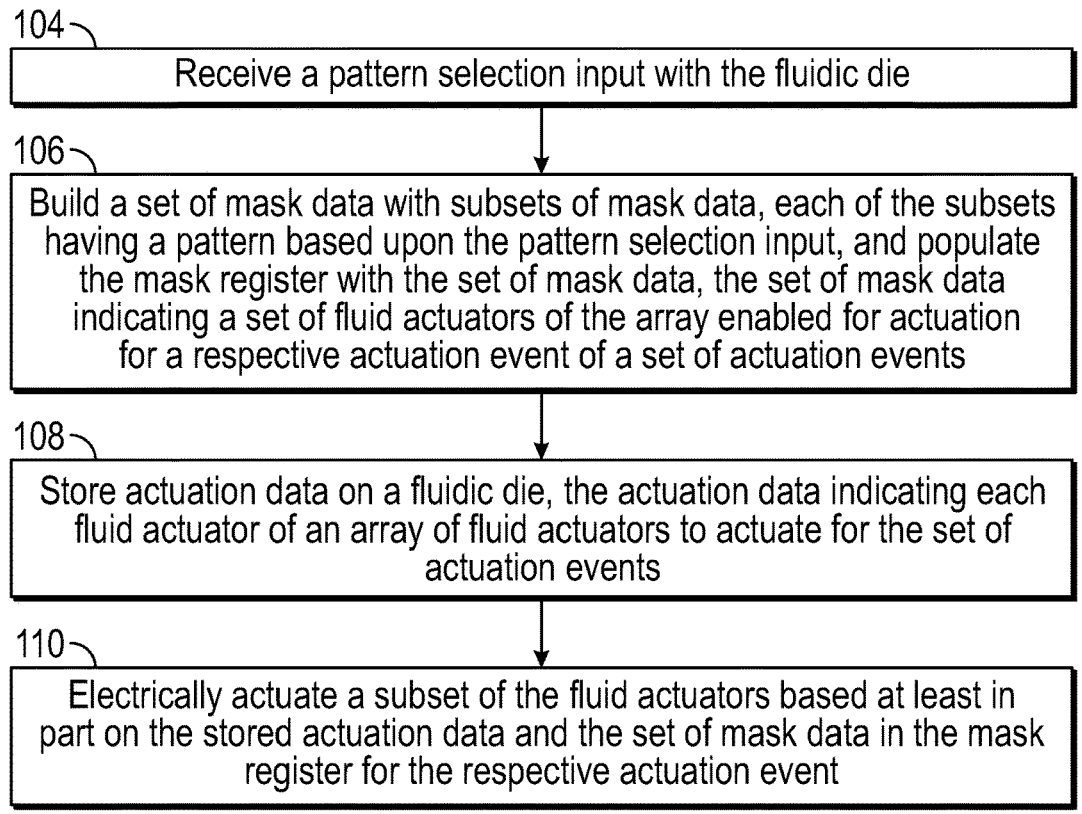
FIG. 2 is a flow diagram of an example method for actuating a subset of fluid actuators on a fluidic die for an actuation event of a set of actuation events.

FIG. 2 is a flow diagram of an example method 100 for controlling the electrical actuation of fluid actuators on a fluidic die. For purposes of discussion, method 100 is described as being carried out with fluidic die 10. It should be appreciated that method 100 may be carried out with any of the fluidic dies described hereafter or other similar fluidic dies.

As indicated by block 104, fluidic die 10 receives a pattern selection input. In one implementation, the pattern selection input may consist of a length value, the length of a subset 44, the length of a primitive (the number of fluid actuators allocated to each primitive) or some other value such as the number of disabled fluid actuators in a subset 44. In another implementation, the pattern selection input may comprise an identifier that identifies one of a plurality of patterns of mask data stored on die 10. In such an implementation, the pattern selection input may additionally identify the pattern length. In another implementation, the pattern selection input may omit the pattern length, wherein the pattern length corresponding to each available pattern of mask data is already stored on die 10 prior to the receipt of the pattern selection input. In one implementation, die input 30 receives a dummy column of fire or actuation data, wherein the associated header bits provide the pattern selection input, indicating what pattern to generate/load into the shift mask register.

As indicated by block 106, mask data generation circuitry 40 builds a set 42 of mask data with a plurality of subsets 44 of mask data. Each of the subsets 44 may have a pattern based upon the pattern selection input received in block 106. Mask data generation circuitry 40 populates mask register 18 with the set 42 of mask data, wherein the set of mask data indicates a set of fluid actuators 12 of the array 14 that are to be enabled for actuation for an individual respective actuation event of a set of actuation events that utilize the actuation data.

As indicated by block 108, actuation data is stored on fluidic die 10. For example, the actuation data may be stored in actuation data register 16. Actuation data indicates each fluid actuator 12 of array 14 to actuate for a set of actuation events.

As indicated by block 110, actuation logic 20 actuates a subset of the larger set of fluid actuators 12 based at least in part upon the stored actuation data and the set of mask data populated in the mask register for the respective actuation event. For example, in one implementation, actuation logic 20 may actuate each fluid actuator for which both the actuation data value and the corresponding mask data value have a bit value of "1". In some implementations, the actuation of the fluid actuator occurs based additionally upon a received electrical pulse, such as a fire pulse signal, that may control the timing duration and frequency of the actuation of the individual fluid actuator.

In many circumstances, the same set of mask data built and stored in mask register 18 is utilized during multiple sets of actuation, events and multiple sets of actuation data in actuation data register 16. Once the set of mask data has been built or generated, printing or fluid ejection is initiated by loading and firing one column or array of fire or actuation data after another (each column has as many fire pulses as nozzles per primitive—or addresses). Each time the header "info" bits associated with the actuation data may be set to say "use the mask data that is already loaded". In this manner, the fluid ejection or printing may go on unabated (without waiting to generate/load a set of mask data in mask register 18). When a different set of mask data is to be utilized, the new set of mask data can be generated/loaded during periods of inactivity by repeating blocks 104 and 106.

Figure 3:
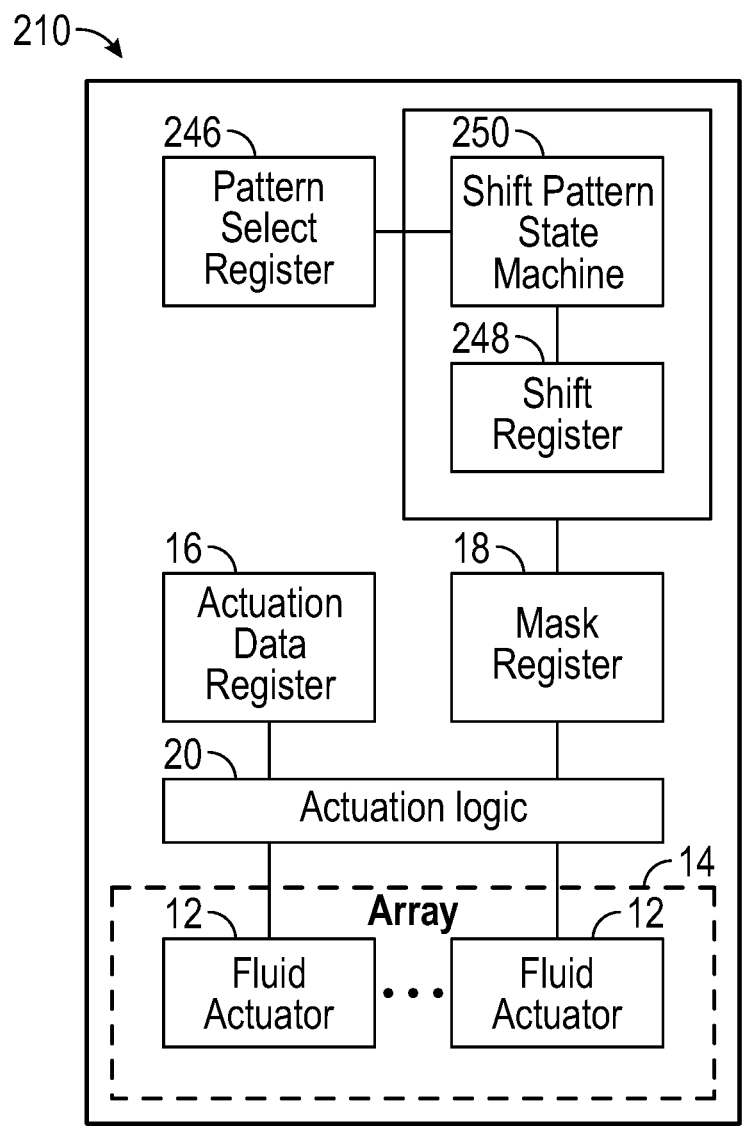
FIG. 3 is a block diagram schematically illustrating some components of another example fluidic die.

FIG. 3 is a schematic diagram of portions of another example fluidic die 210. Fluidic die 210 is similar to fluidic die 10 except that fluidic die 210 is specifically illustrated as comprising mask data generation circuitry 240 that comprises pattern select register 246, shift register 248 and shift pattern state machine 250. Those remaining components of fluidic die 210 which correspond to components of fluidic die 10 are numbered similarly.

Pattern select register 246 comprises a memory data register that stores the value of the pattern selection input received by die input 30 Shift register 248 comprises a register which temporarily stores the subset 44 (shown in FIG. 1) of mask data which forms a part of the larger overall set 42 of mask data that populates mask register 18.

Shift pattern state machine 250 comprises electrical hardware and/or software formed upon die 10 that generates subsets 44 based upon the pattern select input stored in pattern select register 246. In the example illustrated, shift pattern state machine 250 loads shift register 248 with bits having a pattern of values corresponding to the pattern of mask data. Shift pattern state machine 250 loads mask register 18 by shifting the generated, pattern of mask data, forming the subset 44 and temporarily stored in shift register 248, into mask register 18. This process is repeated multiple times to populate mask register 18 with the larger set 42 of mask data for an individual actuation event of a set or series of actuation events. In one implementation, shift pattern state machine 250 may repeatedly generate subsets 44 of the same pattern of mask data, wherein each duplicate subset 44 of mask data is loaded into mask register 18 to form the larger set 42 of mask data.

Figure 4:
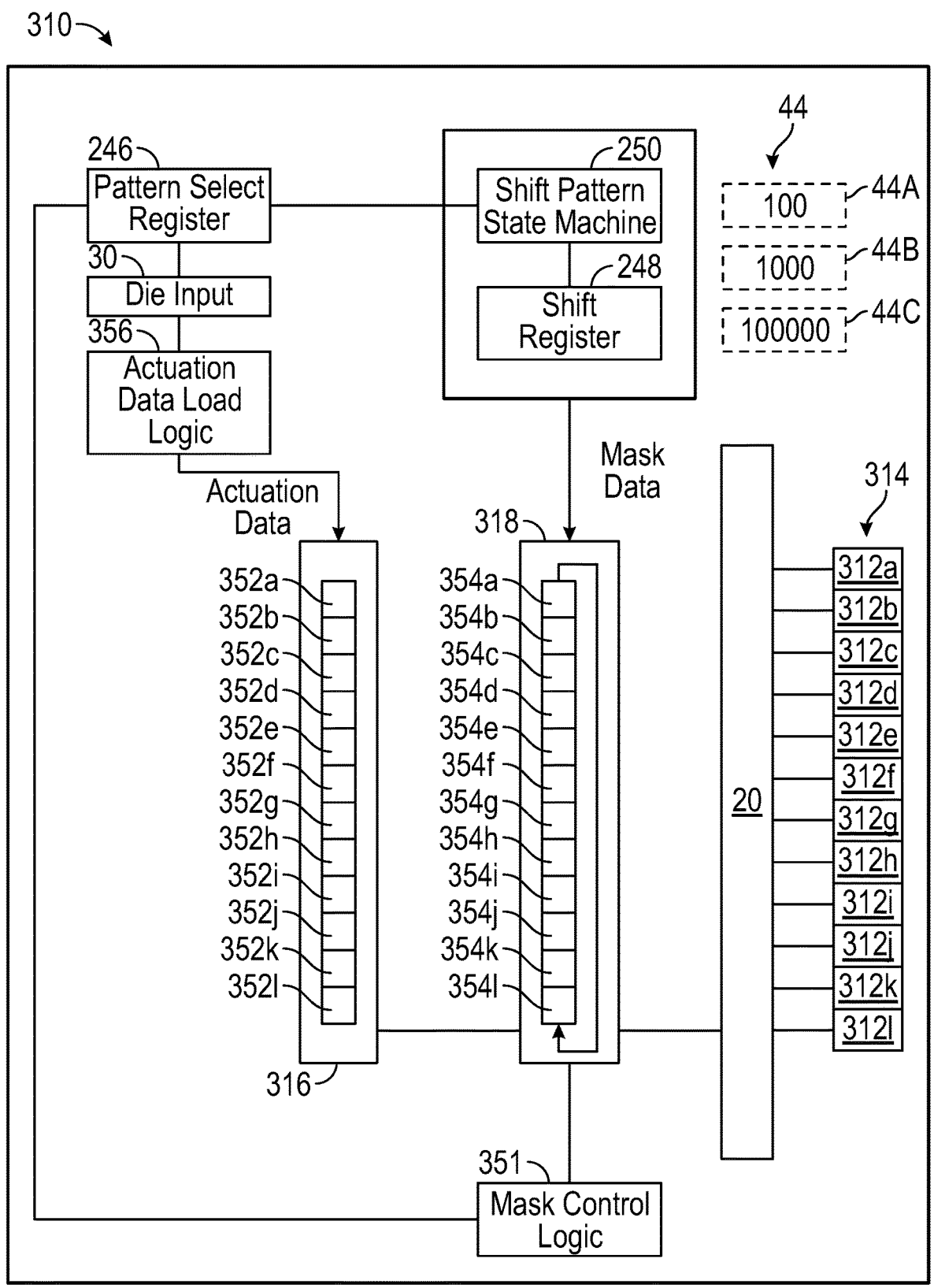
FIG. 4 is a block diagram schematically illustrating some components of another example fluidic die.

FIG. 4 schematically illustrates portions of an example fluidic die 310. Fluidic die 310 is similar to fluidic die 210 except that fluidic die 310 is illustrated as comprising fluid actuators 312*a-i* (collectively referred to as fluid actuator 312), actuation data register 316, mask register 318 and mask control logic 351. Those remaining components of die 310 which correspond to components of die 210 or die 10 are numbered similarly. Each of fluid actuator 312 is similar to fluid actuators 12 described above.

Actuation data register 316 is similar to actuation data register 16 described above except that actuation data register 316 is specifically illustrated as comprises a set of bits 352*a-l* to store actuation data, where each respective bit 352*a-l* of the actuation data register 316 corresponds to a respective fluid actuator 312*a-l*. As shown, actuation data load logic 356 may be coupled to the actuation data register 316 to control the loading of actuation data into actuation data register 316 for a series or set of actuation events.

Mask register 318 is similar to mask register 18 described above except that mask register 318 is specifically illustrated as comprising a set of bits 354*a*-1 to store mask data, where each respective bit 354*a*-1 of the mask register corresponds to a respective fluid actuator 312*a-l*. Mask register 318 is loaded with a set of mask data formed from a plurality of subsets 44 of mask data. As described above, shift pattern state machine 250 loads shift register 248 with bits having a pattern of values corresponding to the pattern of mask data. Each of subsets 44 have a different pattern of mask data. Shift pattern state machine 250 loads mask register 318 by shifting the generated pattern of mask data, forming the subset 44 and temporarily stored in shift register 248, into mask register 318. This process is repeated multiple times to populate mask register 318 with the larger set 42 of mask data for an individual actuation event of a set or series of actuation events.

FIG. 4 illustrates three example subsets 44A, 44B, 44C of mask data that may be generated by shift pattern state machine 250 in response to the pattern select input stored in register 246. The length of each subset 44 (the number of bits) is an integer factor of the total number of fluid actuators 312 in the array 314 served by mask register 318 and actuation data register 316. In the example illustrated, array 314 comprises 12 fluid actuators such that subsets 44A, 44B and 44C have lengths of three bits, 4 bits and 6 bits, respectively. In one implementation, subsets 44A, 44B and 44C correspond to primitives of 3 fluid actuators, 4 fluid actuators and 6 fluid actuators, respectively. Shift pattern state machine 250 loads one of such subsets 44 into shift register 248 based upon a selection stored in register 246 as received by die input 30. Shift pattern state machine 250 repeatedly loads the selected one of subsets 44 out of shift register 248 into mask register 318 to populate mask register 318 with a full set 42 of mask data. As indicated above, in some implementations, shift pattern state machine 250 may load different combinations of subsets 44 having different patterns into mask register 318 to form a single set 42 of mask data having multiple subsets with multiple different patterns. The full set 42 of mask data loaded in a mask register 318 may be used to enable a subset of the total number of fluid actuator 312 for a single actuation event of a set of actuation events that utilize the actuation data in actuation data register 316.

Mask control logic 351 comprises logic circuitry such as processing hardware and/or software coupled to mask register 318. Mask control logic 351 shifts the set 42 of mask data stored in mask register 318 responsive to a respective actuation event to thereby indicate another subset of fluid actuators enabled for actuation for another respective actuation event of the set of actuation events. In one implementation, mask control logic 351 comprises a shift count register and a shift state machine, the shift state machine being connected to the mask register 318. In such an implementation, the shift count register stores the skip pattern, the extent to which the set of mask data is to be shifted within mask register 318. The shift state machine is to input a shift clock to the mask register to shift the mask data stored in the mask register. In other implementations, mask control logic 351 may comprise other circuitry for carrying out the shifting of mask data in register 318.

FIGS. 5A-5D illustrate an example set of actuation events with an example set 42 of mask data in mask register 318. For purposes of the disclosure, each respective bit 352*a-l* of the actuation data register 316 is loaded with a bit value of "1" such that every fluid actuator 314 (shown in FIG. 4) corresponding to an unmasked bit of set 42 (corresponding to a bit and mask register 316 having a value of "1") will be actuated or fired (F) during the respective actuation event of the set of actuation events. As should be appreciated, in other implementations, the actual bits 352*a-l* of actuation data register 316 that are loaded with a bit value of "1" may be less than all of such bits and may be varied depending upon the nozzles or actuators 312 to be fired during the set of actuation events. For example, there may be instances where a particular fluid actuator 312 may correspond to an unmasked bit in mask 318, but will not be fired because the fluid actuator also has a corresponding bit in register 316 with a value of "0".

FIG. 5A illustrate a first example actuation event of the series or set of actuation events as shown in FIGS. 5A-5D. In the example illustrated, the number of actuation events of the set is such that each bit of each subset 44 is assigned a value of "1" during one actuation event of the set of actuation events. In other words, each fluid actuator 312 is enabled at least once in an actuation event of the set of actuation events. The number of actuation events corresponds to the length of each subset 44, the number of bits in each subset 44, which correspond to the size of the primitive.

In the example illustrated, the set 42 is composed of three subsets 44, each subset 44 having a four bit pattern of mask data, 1 0 0 0, corresponding to a primitive length of four actuators. As a result, the set of actuation events shown in FIGS. 5A-5D has four actuation events such that each fluid actuator is enabled at least once during the set. In other implementations where each subset 44 has a length of six bits, the set of actuation events may correspondingly be composed of six actuation events.

In the illustrated example, shift pattern state machine 250 loads shift register 248 with the pattern 1 0 0 0 and then repeatedly shifts out the loaded pattern into mask register 318 until mask register 318 is fully populated. Thereafter, actuation logic 20 actuates individual fluid actuators 312 based upon the corresponding values in actuation data registry 16 and the bits of mask register 318. In first example actuation event, the fluid actuator corresponding to the first bit of each subset 44 or each primitive will be actuated or fired as indicated by "F". In the example shown in FIG. 4, fluid actuators 312*a*, 312*e* and 312*i* are unmasked and will be fired or actuated during the first actuation event of the set of actuation events.

FIG. 5B illustrates mask register 318 after mask control logic 351 in FIG. 4 has shifted the set 42 in a circular fashion in the direction indicated by arrows 363 and 365 for the second actuation event of the set Although such figures illustrate "circular shifting", in other implementations, other forms are shifting may be implemented. For example, such circular shifting may occur in a direction opposite to that which is shown. In yet other implementations, such shifting may be performed in other manners, such as in a first in/first out where the entire mask register shifted by an appropriate number of cycles, shifting in new bits of data in one end and letting data will fall out" at the other end.

In the example illustrated, mask control logic 351 shifts set 42 by two bits or places in the direction indicated by arrow 363. Skipping a bit or shifting by more than one bit assures that a fluid actuator 312 adjacent to the fluid actuator that was actuated or fired in the immediately preceding actuation event will not fired. The shift results in the fluid actuator corresponding to the third bit of each subset 44 or each primitive being actuated or fired. In the example shown in FIG. 4, fluid actuators 312c, 312g and 312k are unmasked and will be fired or actuated during second actuation event of the set.

FIG. 5C illustrates mask register 318 after mask control logic 351 in FIG. 4 has once again shifted the set 42 (from the state shown in FIG. 5C) in the direction indicated by arrow 363 for the third actuation event of the set. In the example illustrated, mask control logic 351 shifts set 42 by one bit or place in the direction indicated by arrow 363. The shift results in the fluid actuator corresponding to the second bit of each subset 44 or each primitive being actuated or fired. In the example shown in FIG. 4, fluid actuator 312b, 312f and 312j are unmasked and will be fired or actuated during third actuation event of the set.

FIG. 5D illustrates mask register 318 after mask control logic 351 in FIG. 4 has once again shifted the set 42 (from the state shown in FIG. 5D) in the direction indicated by arrow 363 for the fourth and final actuation event of the set. In the example illustrated, mask control logic 351 shifts set 42 by two bits or places in the direction indicated by arrow 363. The shift results in the fluid actuator corresponding to the fourth bit of each subset 44 or each primitive being actuated or fired. In the example shown in FIG. 4, fluid actuator 312d, 312h and 312l are unmasked and will be fired or actuated during fourth actuation event of the set.

The skip pattern or number of bits by which pattern 42 is shifted for each actuation event is dependent upon the length of each subset 44 and the corresponding number of actuation events. The number of bits by which pattern 42 is shifted may vary from one actuation event to another or may be uniform from one actuation event or another. For example, in contrast to the example shifting shown in FIG. 5A-5D, in implementations where each subset 44 has a length of eight bits (corresponding to a primitive size of eight fluid actuators), mask control logic 351 may shift sets 42 by three or five places between each actuation event while reducing fluidic and aerodynamic cross talk that may occur when actuators too close to one another are actuated. In yet other implementations, where each subset 44 has a length of eight bits (corresponding to a primitive size of eight fluid actuators), mask control logic 351 may shift sets 42 by one or seven places between each actuation event.

Figure 6:
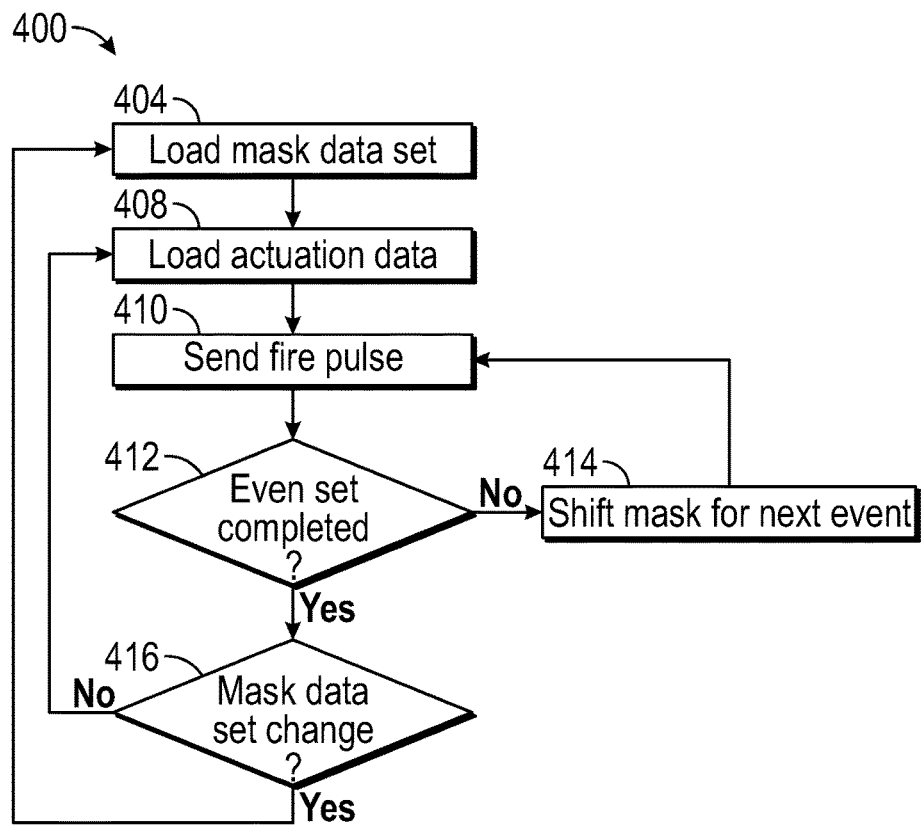
FIG. 6 flow diagram of an example method for actuating fluid actuators during a set of actuation events.

FIG. 6 is a flow diagram of an example method 400 by which actuators 312 may be actuated for a set of actuation events. For purposes of the disclosure, method 400 is described as being carried out with fluidic die 310. It should be appreciated that method 400 may be carried out with any of the fluidic dies described herein or with other similar fluidic dies.

As indicated by block 404, shift pattern state machine 250 loads shift mask register 318 with set 42 as described above. As indicated by block 408, actuation data load logic 356 loads actuation data register 316 with actuation data. As indicated by block 410, a fire pulse is generated and transmitted to actuation logic 20. Actuation logic 20 selectively actuates those fluid actuators 312 for which the respective bits in register 316 and 318 are both active or have a value of "1". Such actuation is controlled based upon the received fire pulse.

As indicated by block 412, mask control logic 351 determines whether the set of actuation events has been completed. As indicated above, a set of actuation events is completed when each fluid actuator has been enabled during the set of actuation events. In other words, each bit value in each subset 44 has had a value of "1" during the set of actuation events. As indicated by block 414, in response to the event set not being completed, mask control logic 351 shifts the set 42 of mask data in register 318 in accordance with the skip pattern as described above. Per block 410, a fire pulse is once again transmitted to actuation logic 310 which selectively actuates those fluid actuators 312 for which the respective bits in register 316 and 318 are both active or have a value of "1".

As indicated by block 416, in response to mask control logic 351 determining that the set of actuation events has been completed, pattern state machine 250 determines whether pattern of mask data, of subsets 44 is to change. For example, shift pattern state machine 250 may determine whether a new pattern resides in pattern select register 246. In some implementations, shift better state machine 250 may receive signals indicating a change from additional logic located on die 310. In one implementation, the length of subset 44 populating mask register 318 may be changed, changing the size of the primitives. As indicated by block 404, in response to receiving signals indicating that the set of mask data in register 318 is to be changed, shift pattern state machine 250 and shift register 248 load a new set of mask data and the process is repeated. As further indicated by block 416, in some circumstances, the mask data set is not to change, wherein method 400 proceeds to block 408, loading a new set of actuation data in actuation data register 316 for the next set of actuation events, wherein the next set of actuation events uses the same mask data set.

Figure 7:
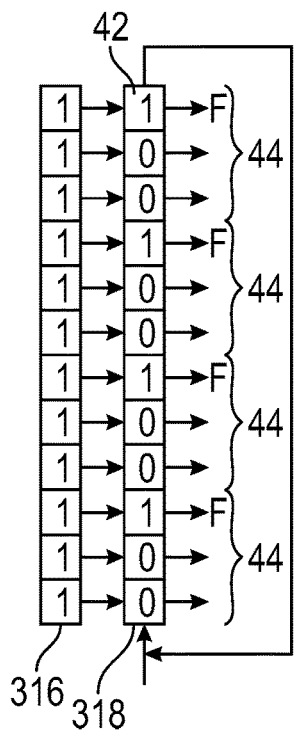
FIG. 7 is a schematic diagram of an example actuation data register and an example mask register populated with another example set of mask data.
Figure 8:
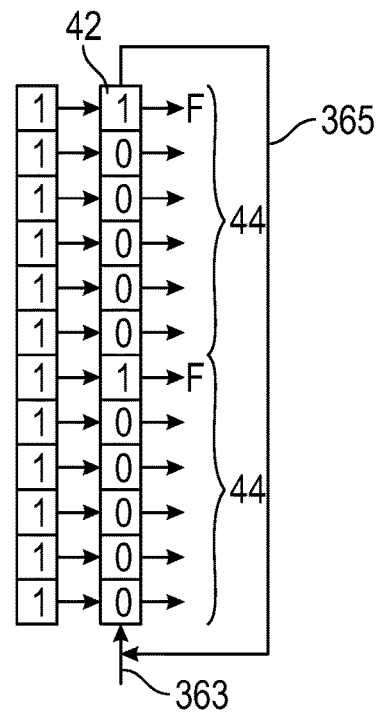
FIG. 8 is a schematic diagram of the example actuation data register in the example mask register of FIG. 7 populated with another example set of mask data.

FIGS. 7 and 8 illustrate alternative sets 42 of mask data for the example fluidic die 310. FIG. 7 illustrates a set 42 of mask data having subsets 44 with a length of three bits corresponding to a primitive size of three fluid actuators. FIG. 8 illustrates a set 42 of mask data having subsets 44 with a length of bits corresponding to primitive size of six fluid actuators. As shown by FIGS. 7 and 8, shift pattern state machine 250 repeatedly loads such subsets 44 into shift register 318 until mask register 318 is populated with the full set 42 of mask data. When carrying out the multiple actuation events of the set of actuation events, mask control logic 351 shifts the respective set 42 by a predetermined number of bits or places or according to a predetermined skip pattern as described above with respect to the example shown in FIGS. 5A-5D.

Figure 9:
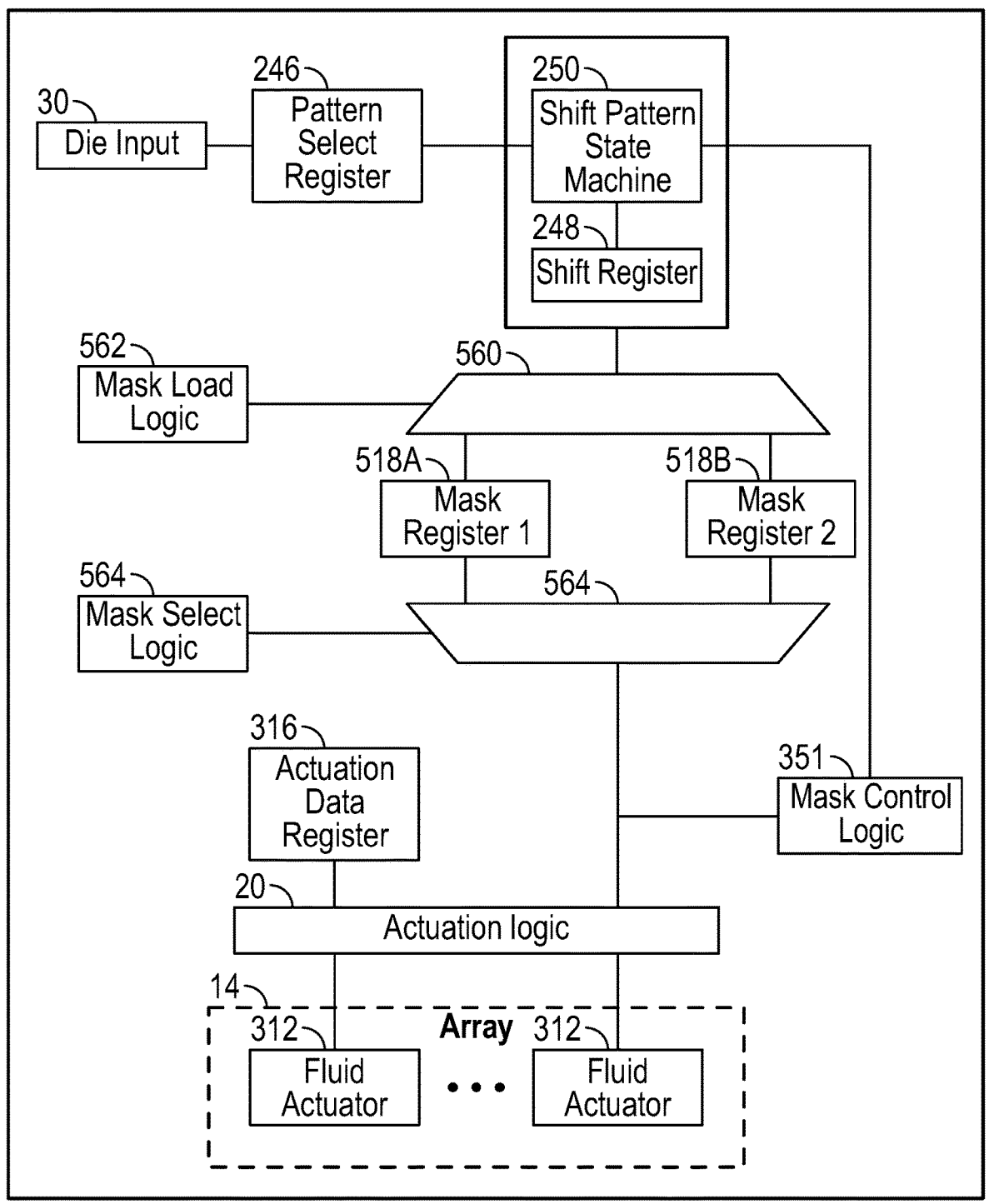
FIG. 9 is a block diagram schematically illustrating some components of an example fluidic die.

FIG. 9 is a block diagram illustrating some components of an example fluidic die 510. Fluidic die 510 is similar to fluidic die 310 except that fluidic die 510 comprises multiple mask registers and that fluidic die 510 loads one mask register while the other mask register is being utilized during a set of actuation events. Fluidic die 510 facilitates a smooth transition between different sets 42 of mask data for different sets of actuation events. In lieu of mask register 318, fluid die 510 comprises mask registers 518A, 518B (collectively referred to as mask registers 518) and additionally comprises multiplexer 560, mask load logic 562, multiplexer 564 and mask select logic 564. Those remaining components of fluid die 510 which correspond to points of fluidic die 310 are numbered similarly.

Mask registers 518 are each similar to mask register 318 described above. In one implementation, each of mask registers 518 has a number of bits corresponding to the number of fluid actuators in an array as well as the number of bits of actuation data register 316. Although the example shown in FIGS. 4, 5A-5D, 7 and 8 are each illustrated as having a mask register 318 having a length of 12 bits or 12 fluid actuators, it should be appreciated that the number of fluid actuators as well as the number of corresponding bits in mask registers 518 and actuation data register 318 may be much larger in practice.

Multiplexer 560 and mask load logic 562 cooperate to switch between the loading of mask registers 518A and the loading of mask register 518B by shift pattern state machine 250. Mask load logic 562 and multiplexer 560 direct the subsets 44 of mask data being shifted out of shift register 248 by shift pattern state machine 250 to a selected one of mask registers 518, the mask register 518A, 518B that is in a standby mode or that is not being utilized by actuation logic 20 in the actuation of fluid actuators 312 during a respective set of actuation events.

Multiplexer 564 and mask select logic 564 cooperate to switch between the use of mask register 518A in the mask register 518B by actuation logic 24 sets of actuation events. Mask select logic 564 determines when a new set of mask data is to be utilized for a set of actuation events based upon input received at die input 30. In response to determining that a new set of mask is to be utilized, mask select logic 564 outputs signals to multiplexer 564 which transmits a new set of mask data to actuation logic 20 for a new set of actuation events. In such a fashion, fluid die 510 may more seamlessly switch between different sets of mask data, reducing or eliminating interruptions for the generation and loading of a new set of mask data into a mask register. As described above, mask control logic 351 shifts the set of mask data being utilized between each of the individual actuation events of the set of actuation events.

In operation, during the actuation of subsets of fluid actuators 312 during actuation events of a first set of actuation events in accordance with the actuation data in register 316 and the mask data in register 518A, fluidic die 510 may receive new pattern selection input at die input 30. The new pattern selection input may be stored in pattern select register 246. Based upon the received pattern selection input, mask load logic 562 may output signals to multiplexer 560 connecting shift pattern state machine 250 to the unused mask register 518B. Shift pattern state machine 250 may generate and load subsets 44 into the selected mask register 518B. Once the generation and loading of subsets 44 of mask data into mask register 518B is near completion or has been completed, mask load logic 562 may output signals to mask select logic 564 indicating a change in the set of mask data for the next set of actuation events.

Upon completion of the ongoing set of actuation events, mask select logic 564 may output control signals to multiplexer 564 disconnecting mask register 518A from actuation logic 20 and connecting mask register 518B to actuation logic 20. Thereafter, actuation logic 20 actuates different subsets of fluid actuators 312 during different actuation events of the second set of actuation events in accordance with actuation data in register 316 and the mask data in register 518B. This process may be repeated when new pattern select input is received at die input 30 and stored in pattern select register 246, wherein the set 42 of mask data generated based upon the new pattern is formed in the presently unused mask register, mask register 518A. During periods of ejection activity, both of mask registers 518 may be populated with mask data at the same time for successive sets of actuation events. In other implementations, other logic circuitry may be utilized to alternate between multiple mask registers to reduce interruptions of the actuation of fluid actuators. In some implementations, fluidic die 510 may comprise more than two mask, registers, wherein the loading and use of such mask registers is sequenced.

Figure 10:
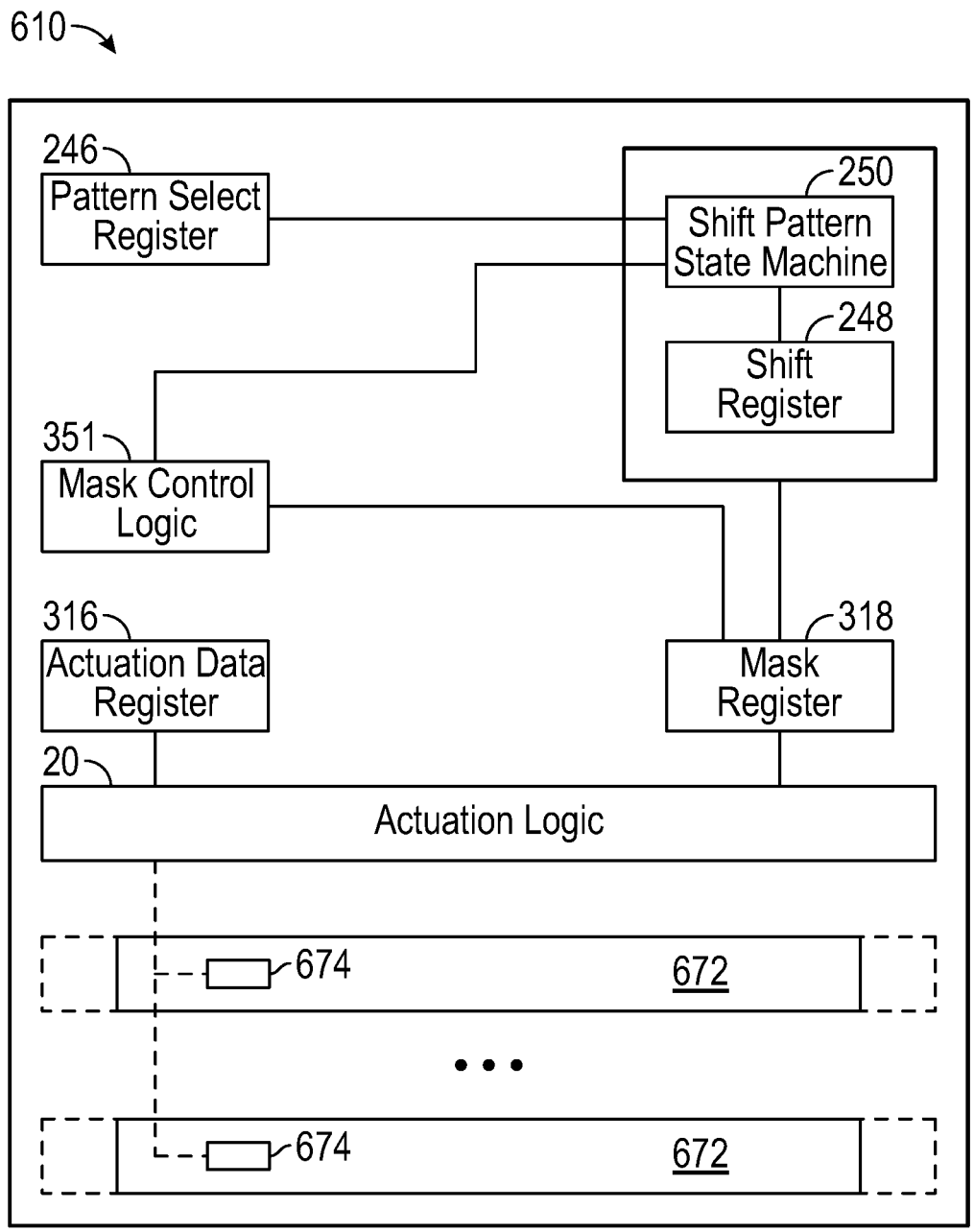
FIG. 10 is a block diagram schematically illustrating some components of an example fluidic die.

FIG. 10 is a block diagram illustrating some components of an example fluidic die 610. Fluidic die 610 is similar to fluidic die 310 except that fluidic die 610 is specifically illustrated as comprising a plurality of microfluidic channels 672, which may be referred to as an array of microfluidic channels. In the example illustrated, fluid actuators, in the form of fluid pumps 674 are disposed in each microfluidic channel 672. Those remaining components of fluidic die 610 which correspond to components of fluidic die 310 are numbered similarly.

Fluidic die 610 may operate in a fashion similar to that described above with respect to the operation of fluidic die 310. Pattern select a 246 stores the received pattern selection input. Shift pattern state machine 250 generates and loads shift register 248 with a subset 44 of mask data based upon the pattern selection input stored in register 246. Shift pattern state machine 250 further shifts the subset 44 from shift register 248 into mask register 318. The generation and shifting of subset 44 into mask rest 318 is continued until mask register 318 is populated.

Actuation logic 20 fires or actuates a subset of the fluid pumps 674 during an actuation event of a set of actuation events based upon the values in actuation register 316 and mask register 318. Prior to a subsequent actuation event of the set of actuation events, mask control logic 351 shifts the set of mask data in mask register 318 according to a predetermined skip pattern. This process is repeated until a set of actuation events has been completed, wherein each fluid pump of the array has been enabled during the set of actuation events. Thereafter, the next set of actuation events may be carried out with the same pattern stored in pattern select register 246 or may be carried out with a new pattern selection input received by and stored in pattern select register 246.

Figure 11:
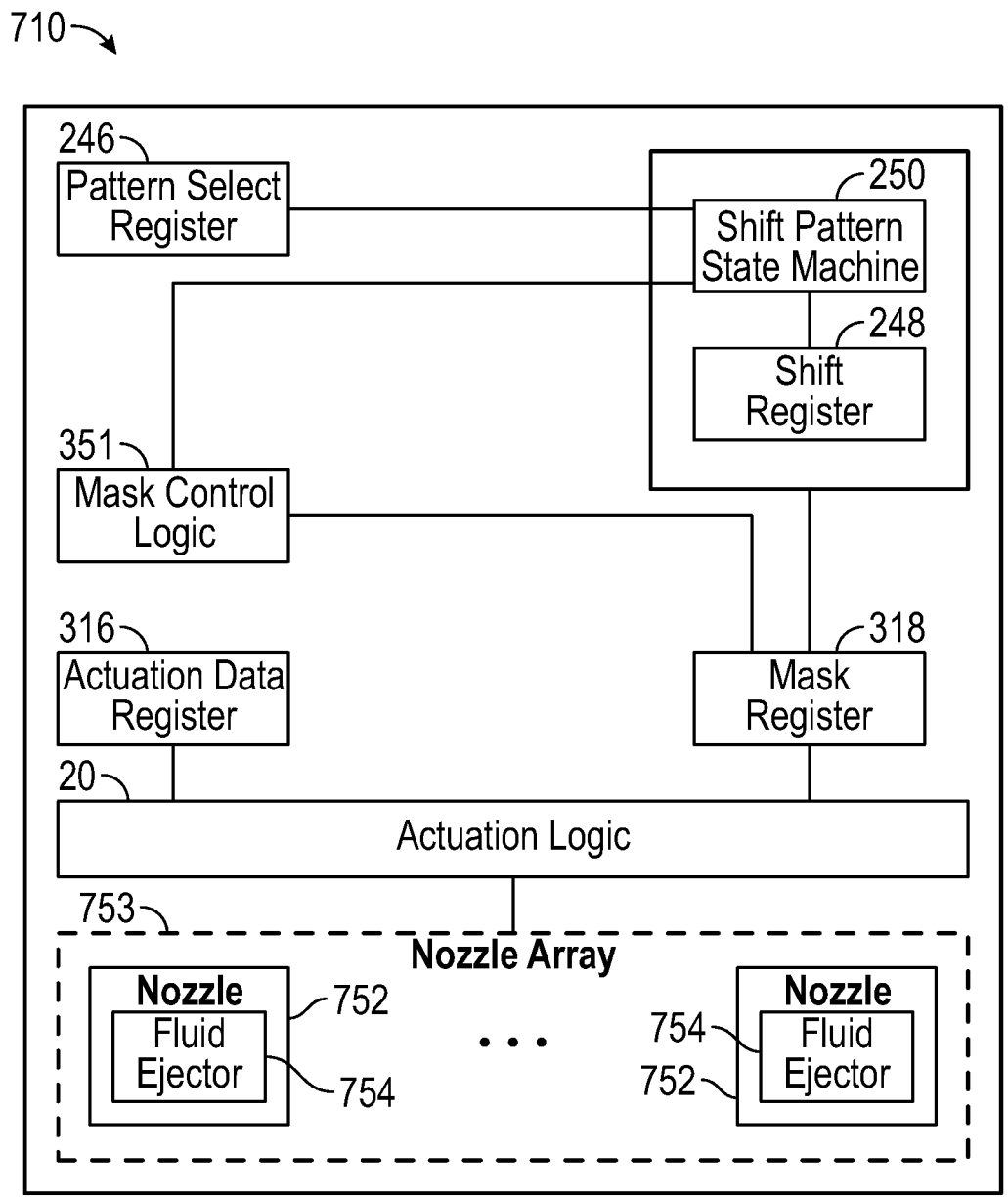
FIG. 11 is a block diagram schematically illustrating some components of an example fluidic die.

FIG. 11 is a block diagram illustrating some components of an example fluidic die 710. Fluidic die 710 is similar to fluidic die 310 except that fluidic die 710 is specifically illustrated as comprising a plurality of nozzles 752, which may be referred to as an array 753 of nozzles 752. In the example illustrated, fluid actuators, in the form of fluid ejectors 754 provided for each of the nozzles 752. Those remaining components of fluidic die 710 which correspond to components of fluidic die 310 are numbered similarly.

Fluidic die 710 may operate in a fashion similar to that described above with respect to the operation of fluidic die 310. Pattern select register 246 stores the received pattern selection input. Shift pattern state machine 250 generates and loads shift register 248 with a subset 44 of mask data based upon the pattern selection input stored in register 246. Shift pattern state machine 250 further shifts the subset 44 from shift register 248 into mask register 318. The generation and shifting of subset 44 into mask rest 318 is continued until mask register 318 is populated. Actuation logic 20 fires or actuates a subset of the fluid ejectors 754/nozzles 752 during an actuation event of a set of actuation events based upon the values in actuation register 316 and mask register 318. Prior to a subsequent actuation event of the set of actuation events, mask control logic 351 shifts the set of mask data in mask register 318 according to a predetermined skip pattern. This process is repeated until a set of actuation events has been completed, wherein each fluid ejector 752 of the array 753 has been enabled during the set of actuation events. Thereafter, the next set of actuation events may be carried out with the same pattern stored in pattern select register 246 or may be carried out with a new pattern selection input received by and stored in pattern select register 246.

Figure 12:
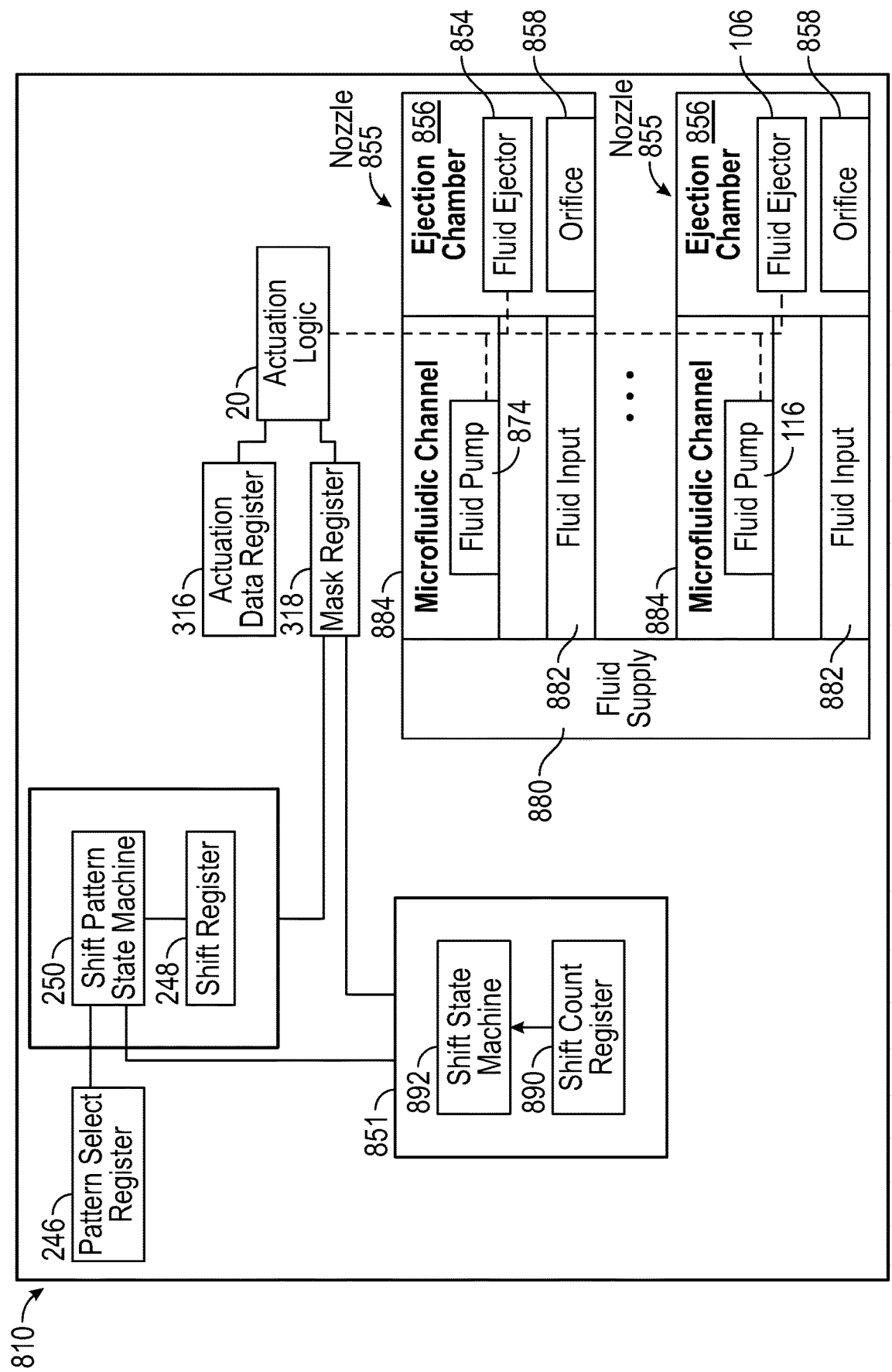
FIG. 12 is a block diagram schematically illustrating some components of an example fluidic die.

FIG. 12 is a block diagram illustrating some components of an example fluidic die 810. Fluidic die 810 is similar to fluidic die 710 except, that fluidic die 810 is illustrated as comprising an array of fluid actuators in the form of fluid ejectors 854 and fluid pumps 874 connected to actuation logic 20. Fluid ejectors 854 and fluid pumps 874 are paired along a fluid supply 880, wherein each of the fluid pumps 874 circulates fluid to and/or from an associated fluid ejector 854.

As further shown by FIG. 12, each fluid ejector 854 is part of a nozzle 855 having an ejection chamber 856 having an orifice 858 and in which the fluid ejector 854 is located. Each ejection chamber 856 is fluidly connected to fluid supply 880 by a fluid input 882 and a microfluidic channel 884. In the example illustrated, each fluid input 882 and microfluidic channel 884 facilitate circulation of fluid into ejection chamber 856, through and across ejection chamber 856 and out of ejection chamber 856 back to fluid supply 880. In the example illustrated, such circulation is facilitated by fluid pump 874 within microfluidic channel 884.

In one implementation, fluid supply 880 comprises an elongated slot supplying fluid to each of the fluid ejectors 854 of the array of dies that are actuated based upon the actuation data contained in actuation data register 316 and the mask data contained in mask register 318. In another implementation, fluid supply 880 may comprise an array of ink feed holes. In one implementation, fluid supply 80 further supplies fluid to fluid ejectors 854 and fluid pumps 874 located on an opposite side of fluid supply 880.

FIG. 12 further illustrates mask control logic 851 which comprises shift count register 890 and shift state machine 892. Shift count register 890 comprises a memory data register that stores a skip value indicating the number of bits by which we set 42 of mask data contained in the shift mask register 318 is to be shifted for each actuation event of a set of actuation events. Shift state machine 892 inputs the shift clock to mask register 318 based upon the value stored in register 890 to shift the set of mask data stored in mask register 318 after the first actuation event and for each subsequent actuation event of a set of actuation events.

Figure 13:
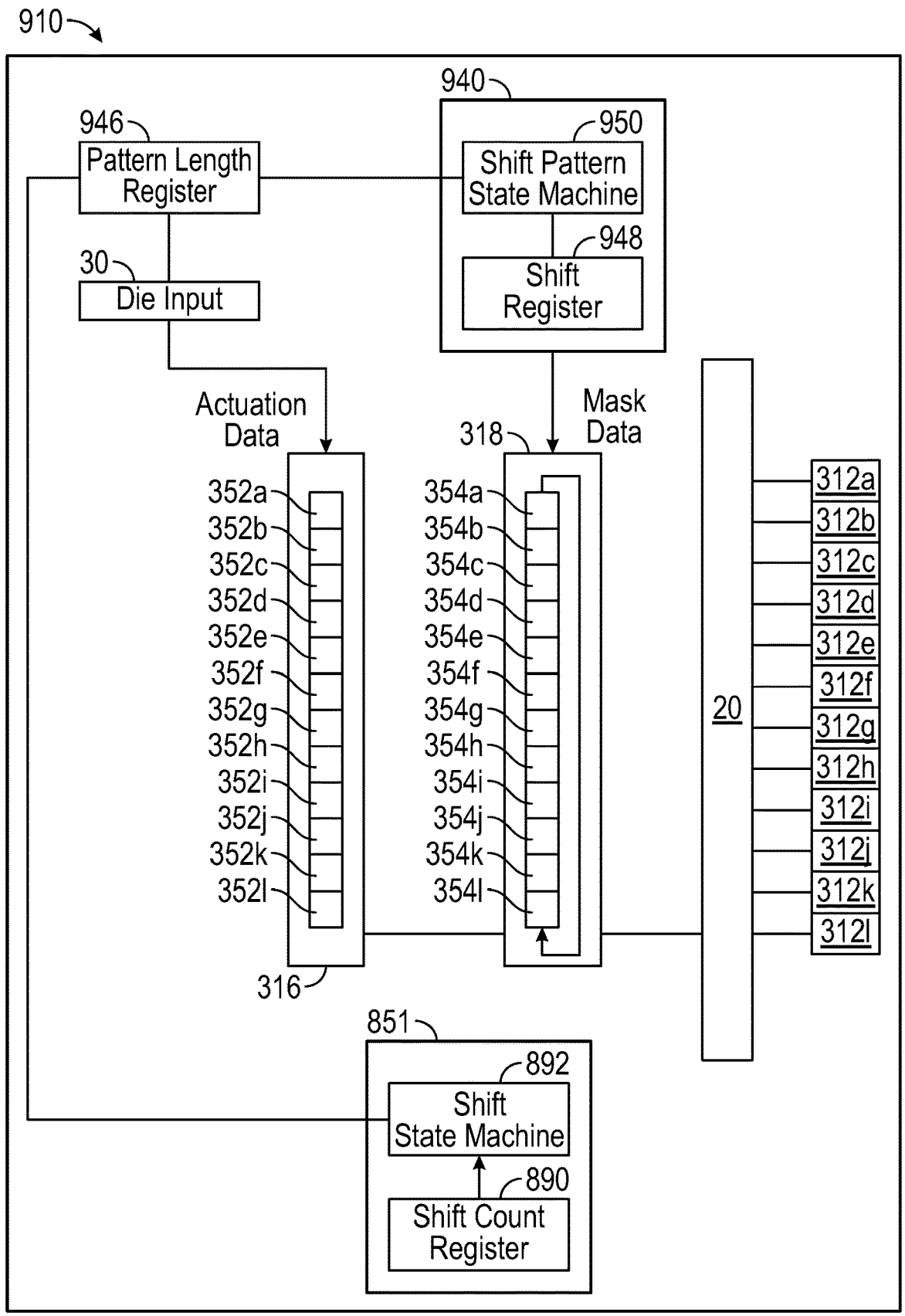
FIG. 13 is a block diagram schematically illustrating some components of an example fluidic die.

FIG. 13 is a block diagram illustrating some components of an example fluidic die 910. Fluidic die 910 is similar to fluidic die 310 described above except that fluidic die 910 comprises mask data generation circuitry 940 in the form of pattern length register 946, shift register 948 and shift pattern state machine 950. Those remaining components of die 910 which correspond to components of die 310 and die 810 are numbered similarly.

Pattern length register 946 comprises a memory data register that stores a pattern selection input in the form of a value that indicates a selected length of a subset 44 (shown in FIG. 1) of mask data to be used to form a set 42 (shown in FIG. 1) of mask data in mask register 318. Such input may be received by die input 30. Such input may indicate or correspond to the number of fluid actuators in each primitive for the current set of actuation events to be carried out by actuation logic 20.

Shift register 948 comprises a memory data register connected to mask register 318 which temporarily stores the subset 44 (shown in FIG. 1) of mask data which forms a part of the larger overall set 42 of mask data that populates mask register 318.

Figure 14:
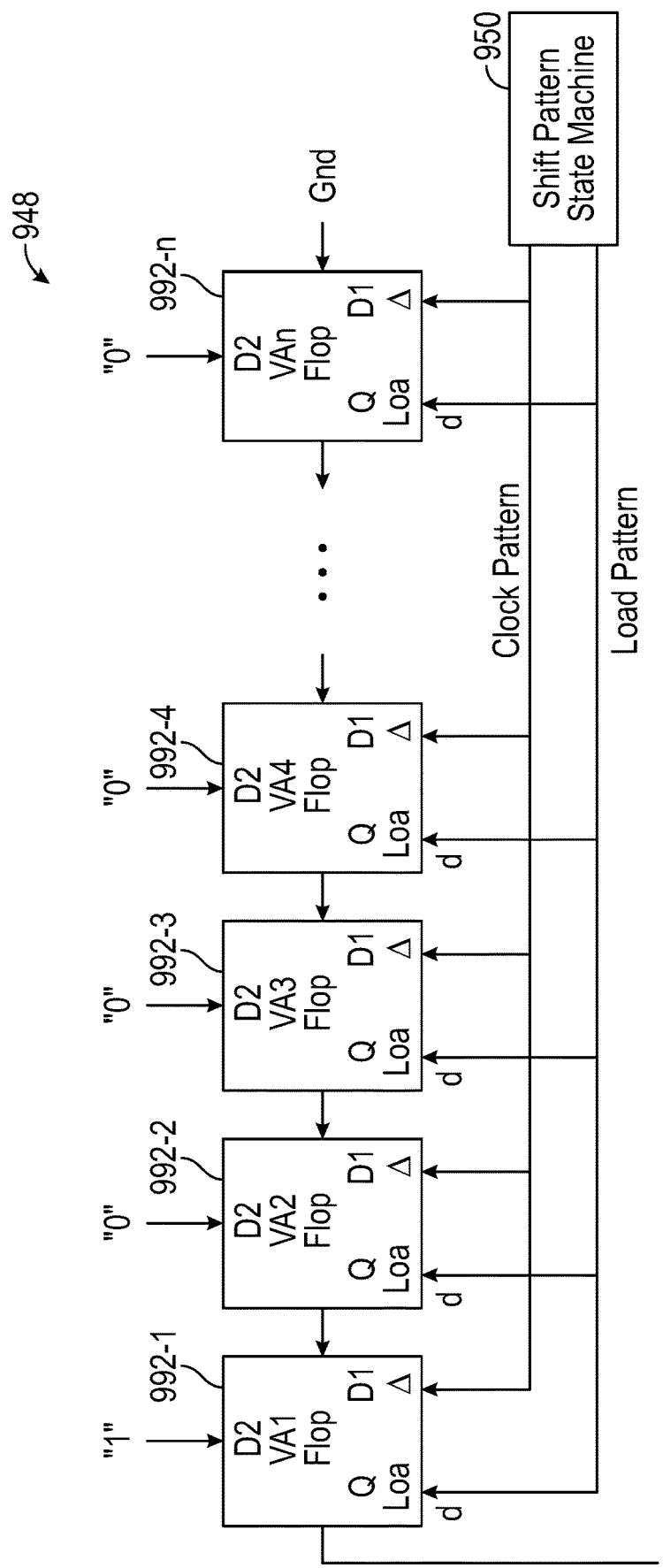
FIG. 14 is a block diagram schematically illustrating an example shift register and shift pattern state machine of the fluidic die of FIG. 13.

Shift pattern state machine 250 comprises electrical hardware and/or software formed upon die 910 that generates subsets 44 based upon the pattern select input stored in pattern length register 246. FIG. 14 illustrates one example of shift register 948 and shift pattern state machine 950. In the example illustrated, shift register 948 comprises a series of digital flip-flops 992-1 to 992-$n$ (collectively referred to as flip-flops 992), wherein "n" corresponds to the largest number of bits that may be selected for a subset 44 which correspond to the largest number of fluid actuators that may be selected for a primitive. As shown by FIG. 14, flip-flop 992-$a$ may be hard wired so as to provide the flop 992-1 with a value of Each of the proceeding flip-flops is hard wired so as to provide such proceeding flip-flops with a value of "0".

Shift state machine 892 shifts the pattern stored in shift register 948 by the amount specified in pattern length register 946. For example, a pattern length of 4 for subset 44, as described above with respect to FIGS. 5A-5D, would prescribe shifting of the 1 0 0 0 0 . . . 0n pattern stored in shift register 948 by 4 places, shifting the values of flip-flop 992-1 (having the value of "1") and flip-flops 992-2, 992-3 and 992-4 (each having a value of zero) into mask register 318. After such shifting, shift register 948, loaded with the pattern 1 0 0 0 0 . . . 0 n pattern, is once again shifted by the four places resulting in mask 318 being successively loaded with another subset of mask data 1 0 0 0. This process is repeated until mask register 418 is fully populated with the set of mask data for use during the set of actuation events. In the example illustrated in which mask register 318 is illustrated as having 12 bits, the process would continue until mask layer 318 is populated with the set of mask data 1 0 0 0 1 0 0 0 1 0 0 0.

Figure 15:
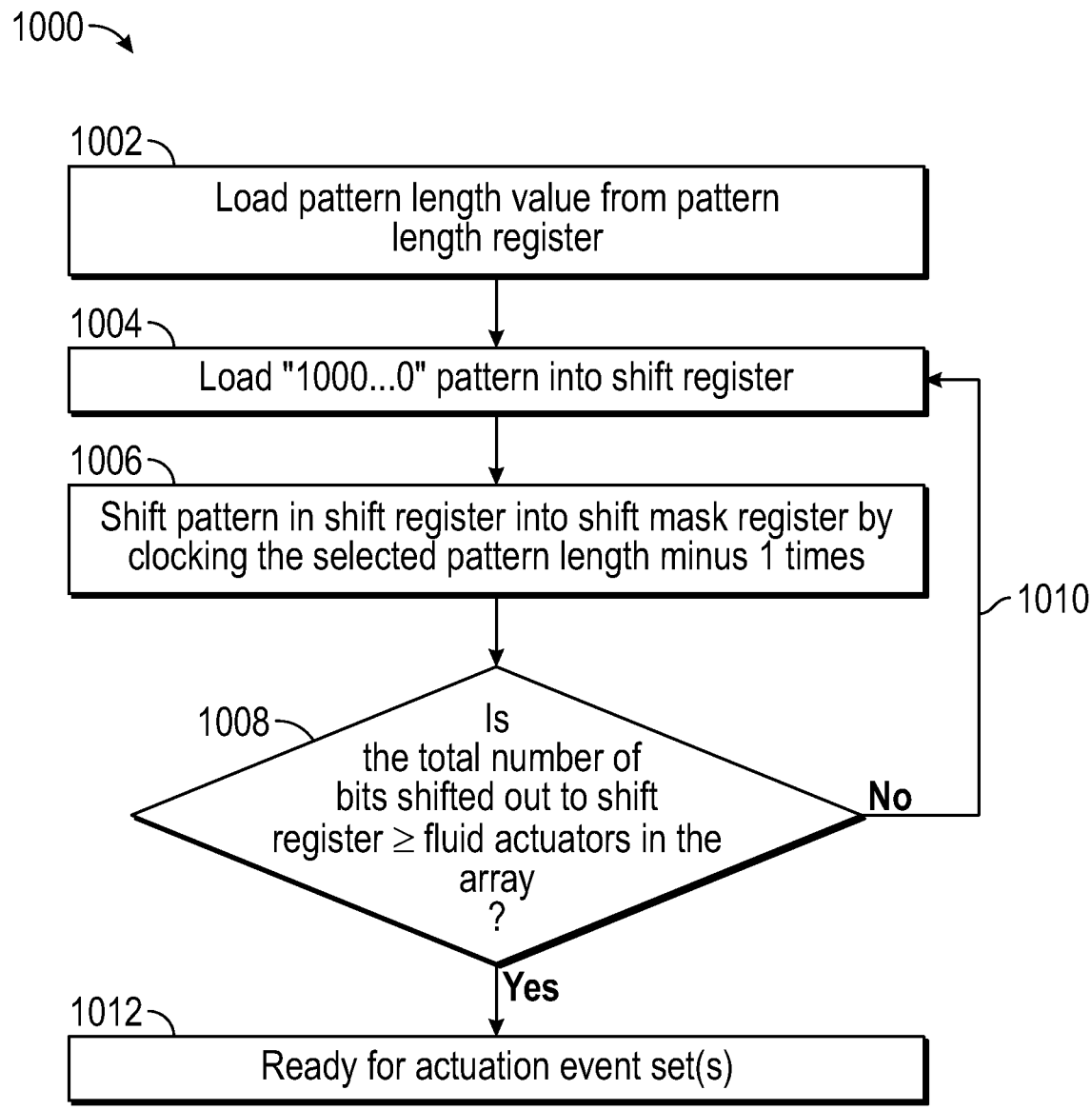
FIG. 15 is a flow diagram illustrating an example method for loading a mask register with a set of mask data.

FIG. 15 is a flow diagram illustrating an example method 1000 by which shift register 948 and shift pattern state machine 950 may generate subsets 44 of mask data and populate mask register 318 with such generated subsets 44 to form the set 42 of mask data in mask register 318. As indicated by block 1002, shift pattern state machine 950 loads the pattern length value from pattern length register 946. As indicated by block 1004, shift pattern state machine 950 loads the pattern contained in the flip-flops 992 of register 948 into shift register 318. In particular, as indicated by block 1006, state machine 950 shifts the pattern in shift register 948 into shift mask register 318 by clocking the selected pattern length −1 times.

As indicated by decision block 1008 and arrow 1010, shift pattern state machine 950 repeats the actions indicated in block 1004 and 1006 until the total number of bits shifted out of shift register 948 is equal to or greater than the number of fluid actuators 312 in the array, thus fully populating mask register 318 with the set 42 of mask data for the set of actuation events. As indicated by decision block 1012, once shift mask register 318 has been populated with a full set 42 of mask data, mask register 318 is ready for use in at least one set of actuation events. When a new set of mask data is to be generated, such as a new set of mask data having a different primitive length or size, method 1000 may be repeated.

Figure 16:
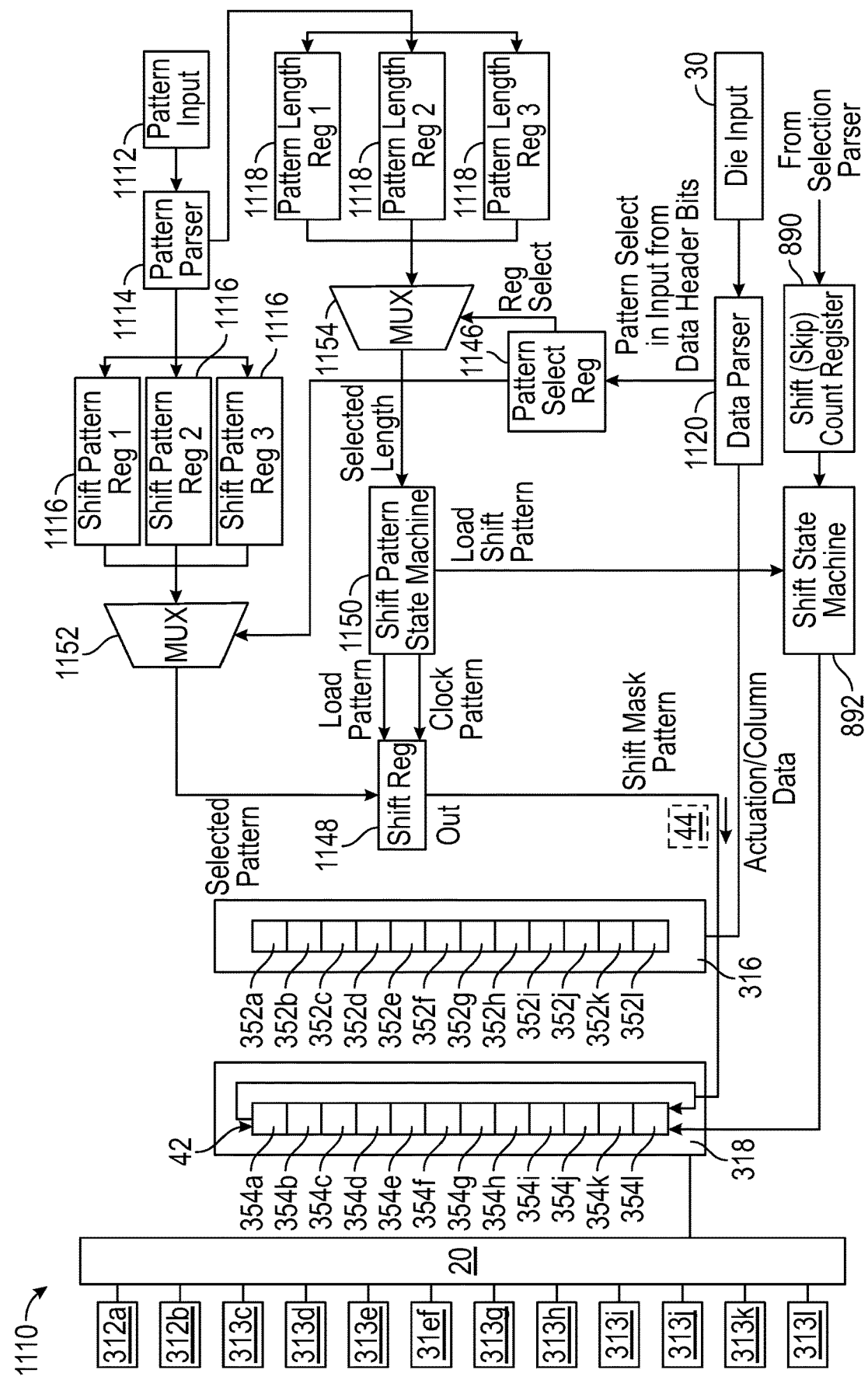
FIG. 16 is a block diagram schematically illustrates some components of an example fluidic die.

FIG. 16 is a block diagram illustrating some components of an example fluidic die 1110. Fluidic die 1110 is similar to fluidic die 910 except that fluidic die 1110 generates subsets 44 of mask data for populating mask register 316 by selecting and using one of different available patterns of mask data stored directly on die 1110. The different available patterns stored on die 1110 may include any pattern of mask data, including patterns wherein more than one bit of a subset 44 may have a value of "1" such that more than one fluid actuator in a subset or "primitive" may be enabled for an actuation event, providing enhanced flexibility with regard to the subset of fluid actuators that may be enabled and fired during actuation events of a set of actuation events.

Fluidic die 1110 comprises pattern input 1112, pattern parser 1114, shift pattern registers 1116, pattern length registers 1118, die input 30, data parser 1110, pattern select register 1146, shift register 1148, shift pattern state machine 1150, multiplexer 1152, multiplexer 1154 shift count register 890 and shift state machine 892. Pattern input 1112 comprises a connection by which die 1110 receives the various patterns available for use by shift pattern state machine 1150 and shift register and 48 one forming subsets 44 of mask data to populate mask register 316. In one implementation, pattern input 1112 comprises a low-speed connection for die 1110 such as a configuration serial input output electrical contact pad of die 1110. In other implementations, pattern input and 12 may comprise other connections for receiving pattern data.

The pattern data received at pattern input 1112 comprises a pattern and its corresponding length. Pattern parser 1114 parses the receive signals and forwards the identified pattern to one of shift pattern registers 1116 and its corresponding length to one of pattern length registers 1118. Pattern shift registers 1116 comprise memory data registers that store the various patterns received through pattern input. Such patterns the same length but different patterns or may have different lengths or numbers of mask data bits. Pattern length registers 1118 store the lengths, the number of bits, associated with each pattern presently being stored by shift pattern registers 1116. Although die 1110 is illustrated as having three shift pattern registers 1116 and their corresponding pattern length registers 1118, in other implementations, die 1110 may have a greater or fewer number of such shift pattern registers and pattern length registers.

Die input 30 described above and comprises an electrical connection or contact pad by which actuation data and a pattern selection input are received. Data parser 1110 parses or separates the actuation data from the pattern selection input. Data parser 1110 forwards the actuation data to actuation data register 316 where it is loaded into register 316. Data parser 1110 forwards and stores the pattern selection input in pattern select register 1148. Pattern select register comprises a memory data register that stores the pattern selection input which comprises an indicator or identifier of one of shift pattern registers 1116 and its corresponding pattern length register 1118.

Shift register 1148 is similar to shift register 948 described above except that shift register 1148 is loaded with a selected one of the patterns from shift pattern registers 1116. Shift pattern state machine 1150 is similar to shift pattern state machine 950 described above except that shift pattern state machine 1150 loads shift register 948 with one of the patterns or mask data subsets stored, in shift pattern registers 1116 and then repeatedly shifts out the subset 44 having the selected pattern in shift register 1148 by an amount specified in the corresponding pattern length register 1118 so as to populate mask register 318 with the full set 42 of mask data.

Figure 17:
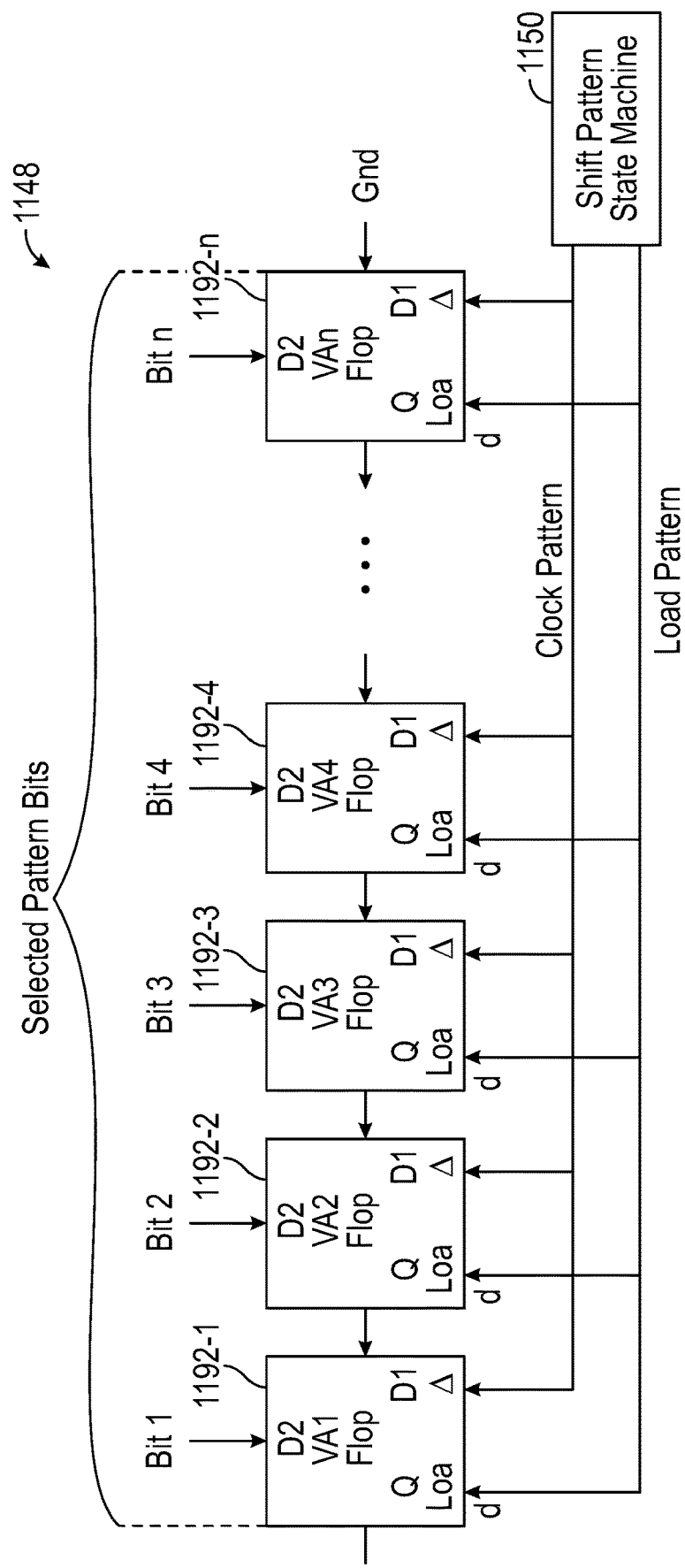
FIG. 17 is a block diagram schematically illustrating an example shift register and shift pattern state machine of the fluidic die of FIG. 16.

FIG. 17 is a schematic diagram illustrating one example of shift register 1148 and shift pattern state machine 1150 As shown by FIG. 17, shift register 1148 comprises a series of flip-flops 1192-1 to 1192-n (collectively referred to as flip-flops 1192), where n is the largest number of bits or the longest length of an available pattern for a subset 44 of mask data. Shift pattern state machine 1150 loads the selected pattern into the flip-flops 1192 using multiplexer 1152 and based upon the identification of the selected shift pattern register as stored in pattern select register 1146. Shift pattern state machine 1150 then shifts out the loaded pattern contained in shift register 1148 to mask register 318 by an amount designated by the corresponding pattern length register 1118 and four a sufficient number of times until the full set 42 of mask data is loaded into mask register 318.

Figure 18:
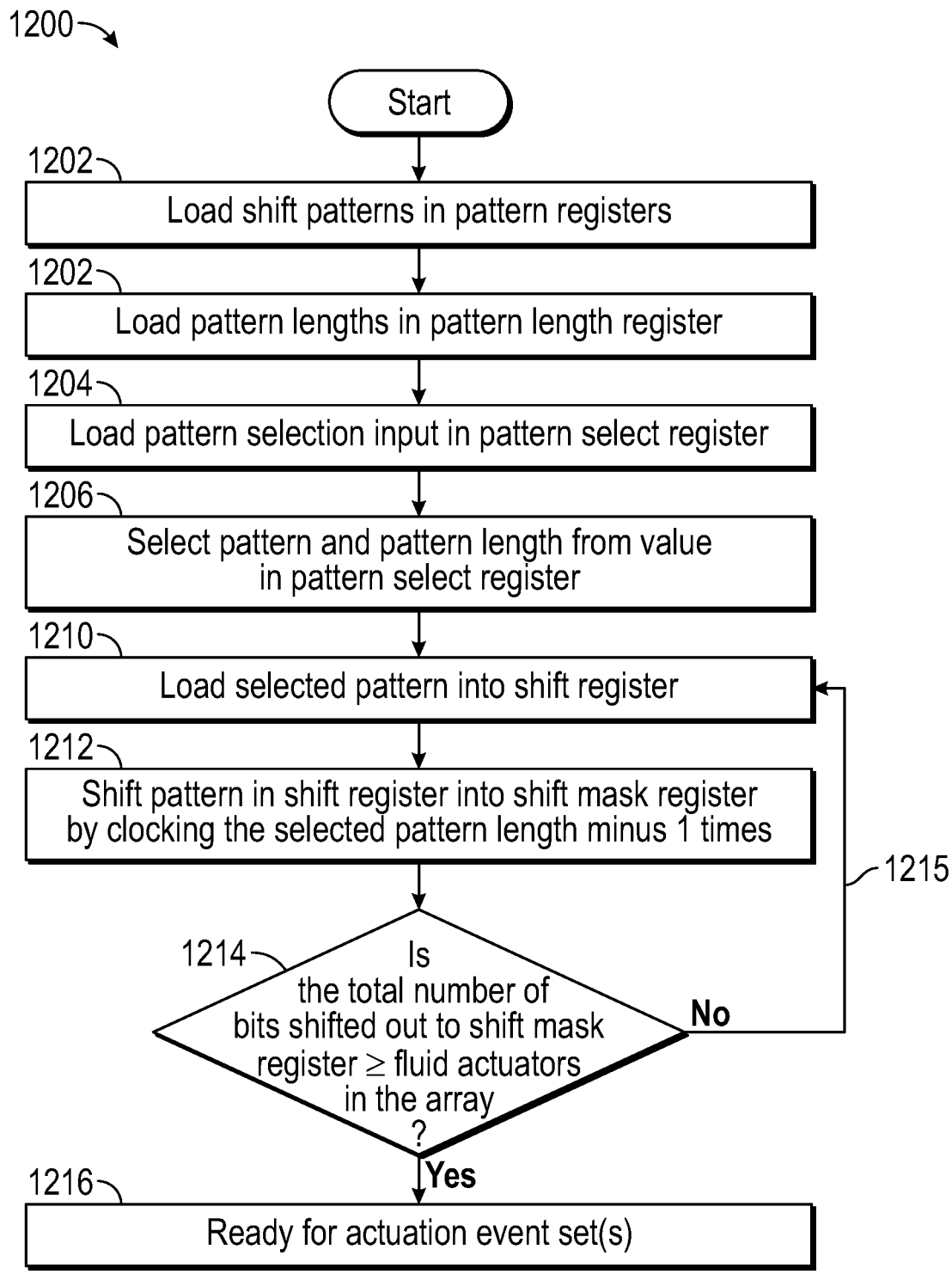
FIG. 18 is a flow diagram of an example method for loading a mask register with a set of mask data.

FIG. 18 is a flow diagram of an example method 1100 for generating subsets 44 of mask data and loading such subsets 44 of mask data into mask register 318 to form the full set 42 of mask data in mask register 318. As indicated by block 1102, various shift patterns are loaded into shift pattern registers 1116. As indicated by block 1104, the pattern lengths corresponding to the patterns loaded into shift pattern registers 1116 in block 1102 are loaded into pattern length registers 1118.

As indicated by block 1104, the received pattern selection input is loaded into the pattern select register 1146. As indicated by block 1106, based upon the value in the pattern select register 1146, multiplexers 1152 and 1154 select a pattern from one of the pattern shift registers 1116 and its corresponding pattern length from the corresponding pattern length register 1118. As indicated by block 1210, shift pattern state machine 1150 loads the selected pattern into shift register 1148. Depending upon the length of the pattern, shift pattern state machine 1150 may not load all of the available flip-flops of register 1148. As indicated by block 1212, shift pattern state machine 1150 loads mask registers 318 with the subset 44 of mask data in register 1148 having the selected pattern. Shift pattern state machine 1150 shifts the pattern in shift register 1148 into shift mask register 318 by clocking the selected pattern length (received in block 1106) −1 times. For example, for a pattern having a length of four bits, shift pattern state machine 1150 would clock shift register three times (the length of 4−1).

As indicated by decision block 1214 and arrow 1215, shift pattern state machine 1150 repeats the actions indicated in block 1210 and 1212 until the total number of bits shifted out of shift register 1148 is equal to or greater than the number of fluid actuators 312 in the array, thus fully populating mask register 318 with the set 42 of mask data for the set of actuation events. As indicated by decision block 1216, once shift mask register 318 has been populated with a full set 42 of mask data, mask register 318 is ready for use during at least one set of actuation events. At various times, new pattern input may be received at pattern input 112, wherein shift pattern registers 1116 and their corresponding pattern length registers 1118 may be populated with new patterns having the same or different lengths.

For each actuation event of the set of actuation events, fluidic die 1110 operates as described above. Actuation logic 20 electrically actuates a subset of fluid actuators 312 based at least in part upon the actuation data within actuation data register 316 and the set 42 of mask data within mask register 318. After each actuation event of a set, shift state machine 892 utilizes the shift count stored in shift, straight 92 shift the set 42 of actuation data by the predetermined skip distance. Such shifting of the set 42 of mask data within mask register 318 is repeated after each actuation event of the set of actuation events until each fluid actuator 312 has been enabled during the set of actuation events. As explained above, the actuation or firing of a fluid actuator that has been enabled remains dependent upon whether the corresponding bit in actuation data register 316 is also enabled or has a value of "1" for the set of actuation events.

Although fluidic die 1110 has been illustrated as comprising shift register 1148 and shift pattern state machine 1150 along with multiplexers 1152, 1154 so as to repeatedly load a selected one of the shift patterns stored in shift pattern registers 1116 into shift register 318, in other implementations, other logic components and other storage or memory elements may be utilized to carry out such functions. Likewise, although fluidic die 1110 has been illustrated as utilizing parsers 1114 and 1110, in other implementations, other logic components or other storage or memory elements may be utilized to load shift pattern registers 1116, to load pattern length registers 1118 and to separate actuation data from pattern selection inputs received by die input 30.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fluidic die comprising:
   an array of fluid actuators;
   an actuation data register to store actuation data that indicates each fluid actuator of the array of fluid actuators to actuate for a set of actuation events;
   a mask register to store mask data that indicates a set of fluid actuators of the array enabled for actuation for a respective actuation event of the set of actuation events;
   mask data generation circuitry to: (1) build a set of mask data from subsets of mask data, each of the subsets having a pattern based upon a pattern selection input, each pattern having a variable length corresponding to a variable primitive size, and (2) to populate the mask register with the set of mask data; and
   actuation logic coupled to the actuation data register, the mask register, and the fluid actuators of the array of fluid actuators, the actuation logic to electrically actuate a subset of the fluid actuators of the array of fluid actuators based at least in part on the actuation data register and the mask register for the respective actuation event.

2. The fluidic die of claim 1, wherein the mask data generation circuitry comprises:
   a shift register;
   a pattern select register to store the pattern selection input; and
   a shift pattern state machine to load the shift register with a selected pattern of mask data based on the stored pattern selection input and to repeatedly load the mask register with the selected pattern of mask data from the shift register.

3. The fluidic die of claim 1, wherein the pattern selection input indicates a selected length of the selected pattern of mask data and wherein the selected pattern of mask data has an initial bit having a first value followed by a number of proceeding bits having a second value different than the first value, the number of proceeding bits based upon the selected length of the selected pattern of mask data.

4. The fluidic die of claim 1 further comprising shift pattern registers to store different available patterns of the mask data, wherein the pattern selection input stored by the pattern select register identifies one of the shift pattern registers.

5. The fluidic die of claim 4 further comprising pattern length registers to store length values associated with the different available patterns of mask data in the shift pattern registers, wherein the identifier of the selected pattern of mask data stored by the pattern select register identifies one of the pattern length registers.

6. The fluidic ejection die of claim 3, wherein the shift pattern registers comprise:
   a first shift pattern register to store a first pattern of mask data corresponding to a first primitive size; and
   a second shift pattern register to store a second pattern of mask data corresponding to a second primitive size different than the first primitive size.

7. The fluidic ejection die of claim 3, wherein the shift pattern registers comprise:
   a first shift pattern register to store a first pattern of mask data corresponding to a first drop weight; and
   a second shift pattern register to store a second pattern of mask data corresponding to a second drop weight different than the first drop weight.

8. The fluidic die of claim 1 further comprising:
   mask control logic to shift the mask data stored in the mask register responsive to the respective actuation event to thereby indicate another subset of fluid actuators enabled for actuation for another respective actuation event of the set of actuation events.

9. The fluid ejection die of claim 8, wherein the mask control logic comprises:
   a shift count register and a shift state machine, the shift state machine connected to the mask register, and the shift state machine to input a shift signal to the mask register to shift the mask data stored in the mask register.

10. The fluidic die of claim 1, wherein the mask data is first mask data, and the fluid ejection die further comprises:
    mask control logic coupled to the mask register, the mask control logic to load second mask data into the mask register responsive to completion of the set of actuation events.

11. The fluidic die of claim 2 further comprising:
    a second mask register, wherein the shift pattern state machine is to load the second mask register with a second selected pattern of mask data and to repeatedly load the second mask register with the second selected pattern of mask data from the shift register; and
    coupling logic to selectively switch coupling of the actuation logic from the mask register to the second mask register, the actuation logic to electrically actuate a subset of the fluid actuators based at least in part on the actuation data register and the second mask register for the respective actuation event.

12. A fluidic die comprising:
    an array of fluid actuators;
    an actuation data register to store actuation data that indicates each fluid actuator of the array of fluid actuators to actuate for a set of actuation events;

a mask register to store mask data that indicates a set of fluid actuators of the array of fluid actuators enabled for actuation for a respective actuation event of the set of actuation events;

memory elements, each memory element to store a pattern of mask data, the pattern having a variable length corresponding to a variable primitive size;

selection logic to select a memory element from the memory elements and from which the mask register is to be loaded with the respective pattern of mask data;

a loader to load the mask register with multiple instances of the pattern of mask data from the selected memory element such that the multiple instances of the pattern of mask data concurrently reside within the mask register; and actuation logic coupled to the actuation data register, the mask register, and the respective fluid actuators, the actuation logic to electrically actuate a subset of the array of fluid actuators based at least in part on the actuation data register and the multiple instances of the pattern of mask data concurrently residing on the mask register for the respective actuation event.

13. A method comprising:

storing actuation data on a fluidic die, the actuation data indicating each fluid actuator of an array of fluid actuators to actuate for a set of actuation events;

receiving a pattern selection input with the fluidic die;

building a set of mask data with subsets of mask data, each of the subsets having a pattern based upon the pattern selection input, the pattern having a variable length corresponding to a variable primitive size for the set of actuation events, and populate the mask register with the set of mask data, the set of mask data indicating a set of fluid actuators of the array enabled for actuation for a respective actuation event of the set of actuation events; and electrically actuating a subset of the array of fluid actuators based at least in part on the stored actuation data and the multiple instances of the selected pattern of mask data in the mask register for the respective actuation event.

14. The method of claim 13 wherein the pattern selection input comprises a pattern length and wherein the method further comprises generating the selected pattern of mask data on the die based upon the pattern length.

15. The method of claim 13 further comprising storing available patterns of mask data on the fluidic die, wherein the pattern selection input comprises a selection of one of the stored available patterns of mask data to serve as the selected pattern of mask data.

16. The fluidic die of claim 1, wherein the pattern selection input indicates the variable primitive size for the set of actuation events and wherein the mask data generation circuitry is to build the set of mask data based at least in part upon the variable primitive size for the set of actuation events.

17. The fluidic die of claim 1, wherein the mask data generation circuitry is to build a first set of mask data from first subsets of mask data having a first length corresponding to a first primitive size and wherein the mask data generation circuitry is to build a second set of mask data from second subsets of mask data having a second length, different than the first length and corresponding to a second primitive size different than the first primitive size.

18. The fluidic die of claim 1, wherein the mask data generation circuitry comprises:

a shift register;

a pattern select register to store the pattern selection input; and a shift pattern state machine to load the shift register with a selected pattern of mask data based on the stored pattern selection input and to repeatedly load the mask register with the selected pattern of mask data from the shift register, wherein the shift pattern registers comprise:

a first shift pattern register to store a first pattern of mask data having a first length corresponding to a first primitive size; and a second shift pattern register to store a second pattern of mask data having a second length different than the first length and corresponding to a second primitive size different than the first primitive size.

19. The fluidic die of claim 1, wherein the mask data generation circuitry is to build different sets of mask data based upon different pattern selection inputs, wherein the different sets of mask data correspond to different selected variable primitive sizes for different sets of actuation events.

20. The fluidic die of claim 12, wherein the memory elements comprise a first memory element storing a first pattern of mask data having a first length corresponding to a first primitive size and a second pattern of mask data having a second length different than the first length and corresponding to a second primitive size different than the first primitive size.

* * * * *